US012794152B2

(12) United States Patent
Yang et al.

(10) Patent No.: US 12,794,152 B2
(45) Date of Patent: Nov. 10, 2026

(54) ELECTRICAL CONNECTOR FOR CIRCUIT BOARDS AND ELECTRICAL CONNECTOR WITH CIRCUIT BOARD

(71) Applicant: Hirose Electric Co., Ltd., Yokohama (JP)

(72) Inventors: Chunkai Yang, Yokohama (JP); Nobuhiro Tamai, Yokohama (JP)

(73) Assignee: HIROSE ELECTRIC CO., LTD., Yokohama (JP)

(*) Notice: Subject to any disclaimer, the term of this patent is extended or adjusted under 35 U.S.C. 154(b) by 196 days.

(21) Appl. No.: 18/502,274

(22) Filed: Nov. 6, 2023

(65) Prior Publication Data

US 2024/0154331 A1 May 9, 2024

(30) Foreign Application Priority Data

Nov. 8, 2022 (JP) ................................ 2022-178753

(51) Int. Cl.
*H01R 12/71* (2011.01)
*H01R 13/502* (2006.01)

(52) U.S. Cl.
CPC ......... *H01R 12/716* (2013.01); *H01R 13/502* (2013.01)

(58) Field of Classification Search
CPC .... H01R 12/716; H01R 13/502; H01R 12/91; H01R 13/2457; H01R 13/648; H01R 13/40; H01R 13/46; H01R 13/6591
See application file for complete search history.

(56) References Cited

U.S. PATENT DOCUMENTS

| | | | | |
|---|---|---|---|---|
| 8,529,275 B2 * | 9/2013 | Kagotani ............ | H01R 43/205 439/41 |
| 8,540,528 B2 * | 9/2013 | Wada .................... | H01R 12/88 439/329 |

(Continued)

FOREIGN PATENT DOCUMENTS

| | | |
|---|---|---|
| JP | 2009129649 A | 6/2009 |
| JP | 2013-45739 A | 3/2013 |
| WO | 2016189891 A1 | 12/2016 |

OTHER PUBLICATIONS

Office Action for corresponding Japanese Application JP2022-178753 issued on Jun. 30, 2026.

*Primary Examiner* — Ahmed M Saeed
(74) *Attorney, Agent, or Firm* — Procopio, Cory, Hargreaves & Savitch LLP

(57) ABSTRACT

The engaging portions 34 of the mating detecting member 30 are provided at locations offset upwardly from the pressure-receiving portion 32A of the operating portion 32 and, when the mating detecting member 30 is located in the retracted position, are positioned in a manner that permits locking engagement, from the rear, with sections of the housing 10 other than the locking arm portion 12; and, when pressure is applied from the rear to the pressure-receiving portion 32A of the operating portion 32 of the mating detecting member 30 located in the retracted position, the location of locking engagement of the engaging portions 34 and the housing 10 is used as a fulcrum to displace the front end of the mating detecting member 30 upward and the abutment portion 35 abuts part of the locking arm portion 12 from the rear.

5 Claims, 12 Drawing Sheets

(56) References Cited

U.S. PATENT DOCUMENTS

| | | | | |
|---|---|---|---|---|
| 8,961,233 | B2 * | 2/2015 | Lai | H01R 24/60 439/626 |
| 9,450,361 | B2 * | 9/2016 | Yeh | H01R 12/7023 |
| 11,411,329 | B2 * | 8/2022 | Yokotani | H01R 9/223 |

* cited by examiner

ELECTRICAL CONNECTOR FOR CIRCUIT BOARDS AND ELECTRICAL CONNECTOR WITH CIRCUIT BOARD

CROSS-REFERENCE TO RELATED APPLICATIONS

This application claims priority to Japanese Patent Application No. 2022-178753, filed Nov. 8, 2022, the contents of which are incorporated herein by reference in its entirety for all purposes.

TECHNICAL FIELD

The present invention relates to an electrical connector for circuit boards disposed on a mounting face of a circuit board and an electrical connector with a circuit board in which said electrical connector for circuit boards is mounted on a mounting face of the circuit board.

BACKGROUND ART

Such electrical connectors for circuit boards are exemplified by the connector disclosed in Patent Document 1, which is a so-called floating connector having a stationary housing secured to a circuit board through the medium of terminals, a housing capable of relative motion with respect to the stationary housing, and a plurality of the above-mentioned terminals provided spanning between the stationary housing and movable housing. In said Patent Document 1, the terminals, which are made by bending metal strip-like pieces in the through-thickness direction, are arranged side-by-side in a direction parallel to the circuit board. Said terminals have a resiliently deformable resilient portion located between a section retained in the stationary housing and a section retained in the movable housing. The resilient portion, which has an inverted U-shaped configuration, has two leg portions extending in the vertical direction, and a bend portion that is located at the top end of the stationary housing and couples the top ends of the two leg portions while being bent in a downwardly open configuration.

The resilient portions located between the stationary housing and movable housing are exposed from both housings. Consequently, characteristic impedance in these resilient portions is increased in comparison with other parts of the terminals, which makes characteristic impedance mismatches more likely to be generated and risks causing degradation in signal transmission quality. According to Patent Document 1, partition wall members made of synthetic plastics are fitted from below into the bend portions of every other terminal among the plurality of terminals. The partition wall members have partition wall portions located on both outer sides of the bend portions in the terminal width direction, with said partition wall portions being located between the bend portions of adjacent terminals. That is, the bend portions of adjacent terminals are separated not by air spaces, but by a layer of synthetic plastics. In this manner, in Patent Document 1, the occurrence of increases in characteristic impedance and, in turn, mismatches in characteristic impedance in the bend portions is avoided by providing synthetic plastic layers between the bend portions.

PATENT DOCUMENTS

Patent Document 1

Japanese Patent Application Publication No. 2013-045739.

SUMMARY

Problems to be Solved

Patent Document 1 does not clearly indicate the stage at which the partition wall members are attached to the bend portions of the terminals during connector manufacture. Assuming that the partition wall members are adapted to be attached to the bend portions of the terminals once said terminals have been retained in place in the stationary housing and movable housing, due to the fact that said bend portions are located at the top end of the stationary housing, i.e., on the far side in the direction of attachment of the partition wall members, the partition wall members will have to be reliably pushed in all the way to the far side, which makes the procedure of partition wall member attachment extremely cumbersome.

With these considerations in mind, it is an object of the present invention to provide an electrical connector for circuit boards and an electrical connector with a circuit board that allow for the simple and easy attachment of a member designed to avoid degradation in the quality of signal transmission in terminals.

Technical Solution (1) The inventive electrical connector for circuit boards is an electrical connector for circuit boards disposed on a mounting face of a circuit board and having a plurality of terminals and a housing retaining the plurality of terminals, wherein the terminals have a connection portion provided at one end and connectable to the mounting face, a contact portion provided at the other end and capable of making contact with a counterpart connect body, and an intermediate portion coupling the connection portion and the contact portion.

Such an electrical connector for circuit boards according to the present invention is characterized by the fact that there is provided a cover member made of an electrically insulating material that is attached to the housing or the terminals in a predetermined direction of attachment, the cover member has a plate-shaped main body portion whose major faces extend in a direction transverse to the direction of attachment, and the main body portion is provided at the rearward end of the electrical connector for circuit boards in the direction of attachment and, as seen in the direction of attachment, covers a range including, at least in part, the sections of the intermediate portions of the terminals that are exposed from the housing.

In the present invention, an electrically insulating layer that covers a range including, at least in part, the sections of the terminals that are exposed from the housing is formed by attaching a cover member made of an electrically insulating material to the housing or the terminals. Therefore, increases in characteristic impedance at least in part of the aforementioned exposed sections are minimized, thereby making characteristic impedance mismatches less likely to occur and, as a result, making it possible to adequately avoid degradation in the quality of signal transmission in terminals. In addition, the main body portion of the cover member is provided at the rearward end of the electrical connector for circuit boards in the aforementioned direction of attachment, i.e., at the proximal end in the direction of attachment. Therefore, when the cover member is attached to the housing or the terminals, the attachment procedure can be accomplished in a simple and easy manner because there is no longer any need, as in the prior art, to attach the member designed to avoid degradation in the quality of signal transmission on the far side in the direction of attachment.

(2) In the invention of (1), the housing may have a stationary housing secured to the circuit board through the medium of the terminals and a movable housing capable of relative motion with respect to the stationary housing, the terminals may be provided spanning between the stationary housing and movable housing, the intermediate portion may have a stationary-side retained portion retained in the stationary housing, a movable-side retained portion retained in the movable housing, and a resilient portion located between the stationary-side retained portion and movable-side retained portion and capable of resilient deformation, and the cover member, which is attached to the stationary housing or movable housing, may be out of contact with the resilient portions at least when the resilient portions are in their free state.

With such an arrangement, the cover member is less likely to interfere with the resilient deformation of the resilient portions because said cover member does not make contact with said resilient portions at least when the resilient portions of the terminals are in their free state. Therefore, the resilient portions can be easily resiliently deformed at a high level of deformation and, as a result, a sufficiently large degree of floating action can be ensured in the movable housing.

(3) In the inventions of (1) or (2), the terminals, whose shape may be obtained by bending a metal strip-like piece in the through-thickness direction, may have a U-shaped section bent in a manner to be open toward the side where the cover member is attached, and the cover member may have upright portions that rise up toward the front in the direction of attachment from the plate-shaped main body portion whose through-thickness direction is the direction of attachment and are positioned in a manner to enter the U-shaped sections. Even though the U-shaped sections are formed in the terminals in this manner, providing the cover member with upright portions positioned so as to enter the U-shaped sections minimizes increases in characteristic impedance in said U-shaped sections and makes it easier to avoid the occurrence of characteristic impedance mismatches.

(4) In the invention of (3), the stationary-side retained portions may be provided extending in the direction of attachment as part of the U-shaped sections and may be formed of a greater width than other parts coupled to the stationary-side retained portions, and the upright portions may have a portion thereof positioned along coupling sections of the stationary-side retained portions and the other parts. In this manner, due to the fact that the stationary-side retained portions are formed of a greater width than the aforementioned other parts, characteristic impedance mismatches are likely to occur in the coupling sections of the stationary-side retained portions and the aforementioned other parts when terminal width dimensions abruptly change in these coupling sections. Thus, providing the upright portions along the aforementioned coupling sections as described above makes it easier to avoid the occurrence of characteristic impedance mismatches.

(5) In the inventions of (1) to (4), the cover member may be attached such that the direction of attachment is an upwardly facing direction at right angles to the mounting face of the circuit board, and may cover a range including, at least in part, the exposed sections of the intermediate portions from below.

(6) The inventive electrical connector with a circuit board is an electrical connector with a circuit board in which the electrical connector for circuit boards of any of the inventions of inventions (1) to (5) is mounted on the mounting face of the circuit board, wherein the circuit board has a ground layer extending along the mounting face, and the ground layer has formed therein empty areas within ranges corresponding to the connecting portions of the terminals.

As a result of forming empty areas free of the ground layer on the circuit board within ranges corresponding to the connecting portions of the terminals in this manner, there is no metal layer and only the plastic layer of the circuit board is present at the locations where the connection portions are connected. Consequently, in the terminals, the characteristic impedance of the connection portions can be brought closer to the characteristic impedance of sections other than the connection portions, as a result of which it becomes easier to avoid the occurrence of characteristic impedance mismatches.

Technical Effect

The present invention can provide an electrical connector for circuit boards and an electrical connector with a circuit board that allow for the simple and easy attachment of a member designed to avoid degradation in the quality of signal transmission in terminals.

BRIEF DESCRIPTION OF THE DRAWINGS

FIGS. 3(A) and 3(B) are views illustrating a state prior to mating connection of the electrical connector for circuit boards and counterpart connector of FIG. 1, wherein FIG. 3(A) is a lateral view, and FIG. 3(B) a plan view.

FIGS. 7(A) to 7(D) are perspective views illustrating the terminals in isolation, wherein FIG. 7(A) shows a first signal terminal, FIG. 7(B) a second signal terminal, FIG. 7(C) a first power supply terminal, and FIG. 7(D) a second power supply terminal.

FIGS. 8(A) and 8(B) are perspective views illustrating the cover member in isolation, wherein FIG. 8(A) is a perspective view in an orientation used for attachment to the electrical connector for circuit boards, and FIG. 8(B) a perspective view in an orientation vertically inverted with respect to the orientation of FIG. 8(A).

FIGS. 11(A) and 11(B) are cross-sectional views illustrating a state after performing the operation of mating of the electrical connector for circuit boards and counterpart connector illustrated in FIG. 9, wherein FIG. 11(A) shows a state in the process of mating, and FIG. 11(B) shows a state after mating connection.

FIGS. 12(A) and 12(B) are cross-sectional views illustrating a state after performing the operation of mating of the electrical connector for circuit boards and counterpart connector illustrated in FIG. 10, wherein FIG. 12(A) shows a state in the process of mating, and FIG. 12(B) shows a state after mating connection.

DETAILED DESCRIPTION

Embodiments of the present invention will be described below with reference to the accompanying drawings.

Figure 1:
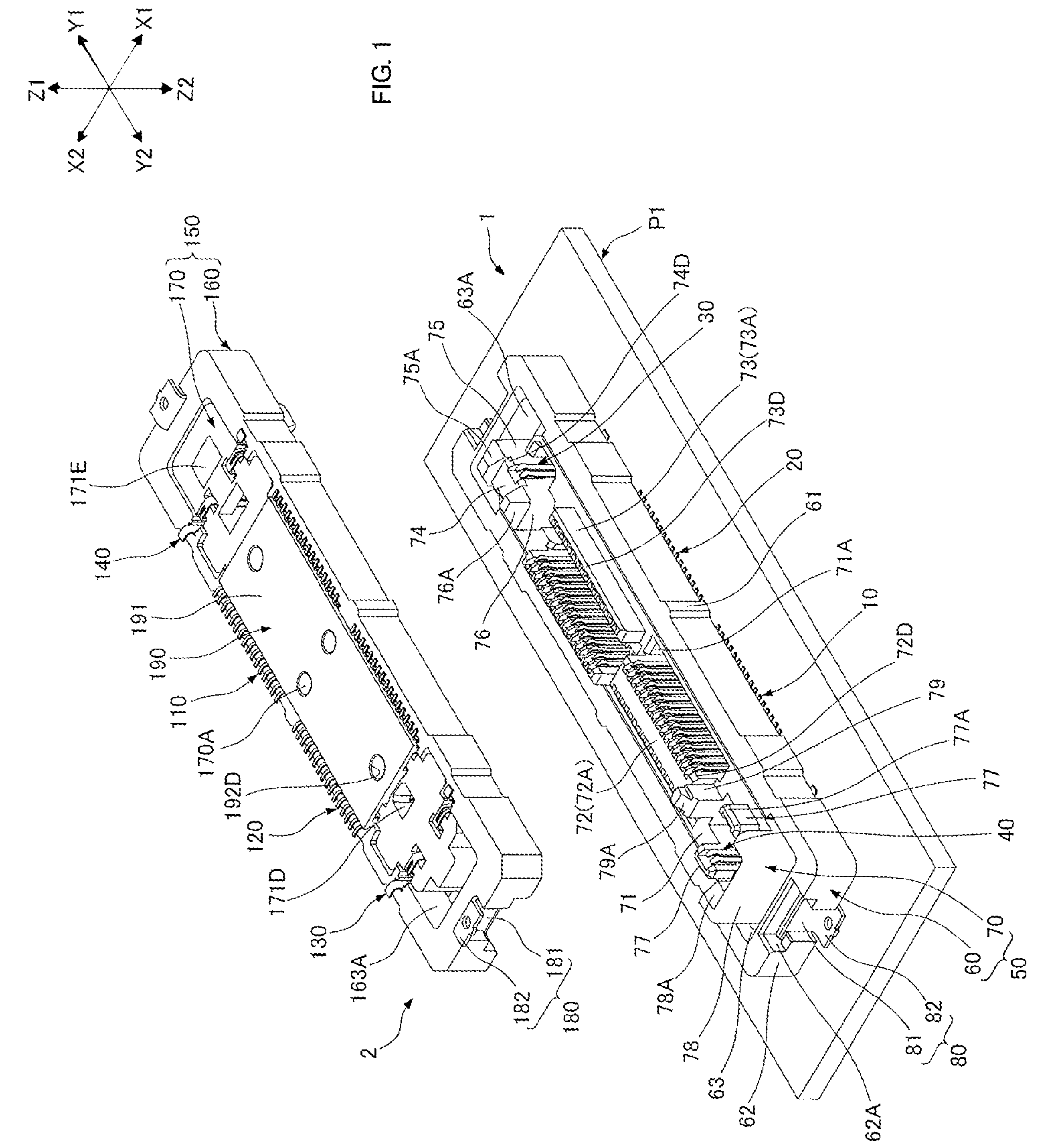
FIG. 1 is a perspective view illustrating an electrical connector for circuit boards according to an embodiment of the present invention along with a counterpart connector, showing a state prior to mating connection as seen obliquely from above.
Figure 2:
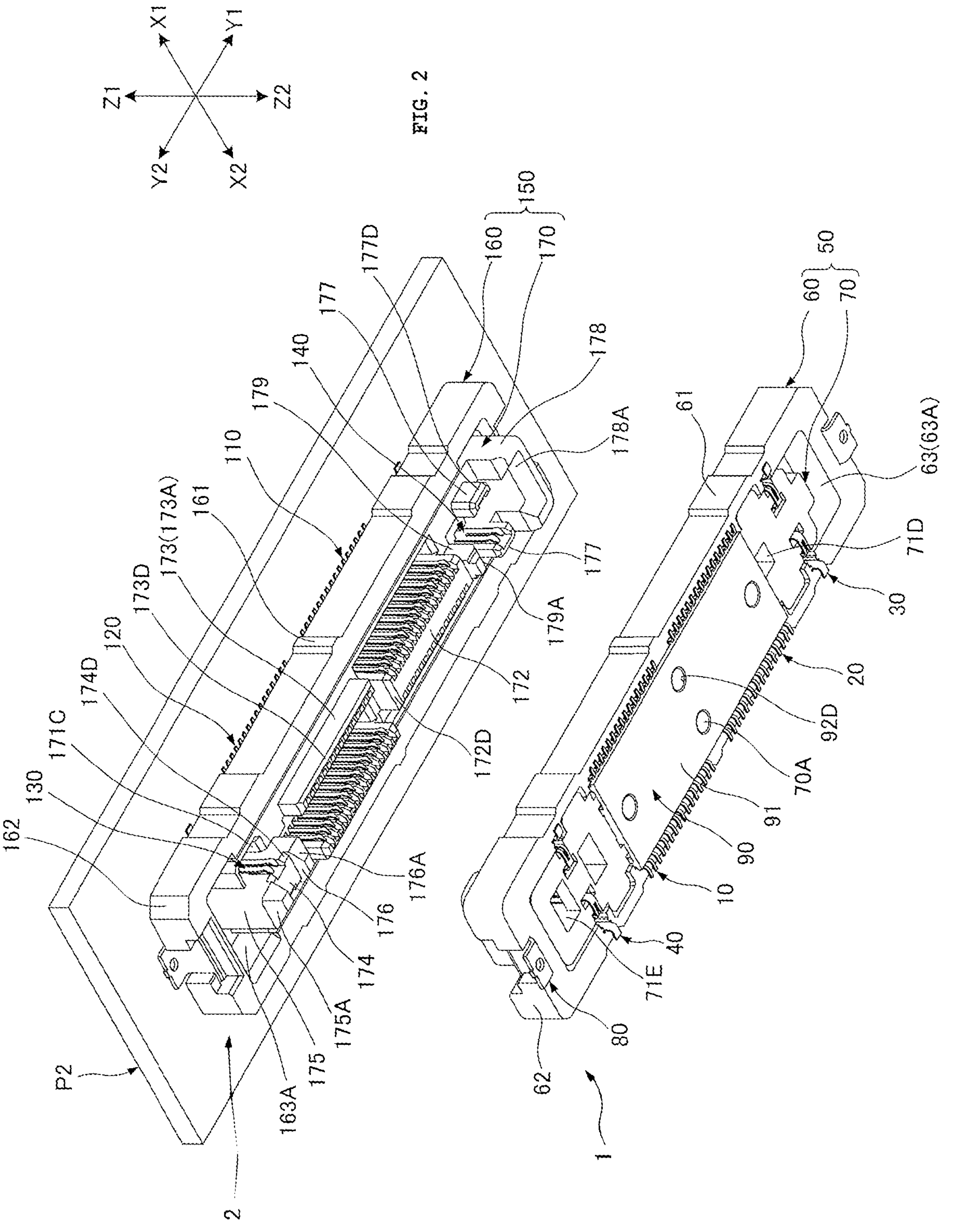
FIG. 2 is a perspective view of the electrical connector for circuit boards and counterpart connector of FIG. 1, showing a state prior to mating connection as seen obliquely from below.
Figure 3A:
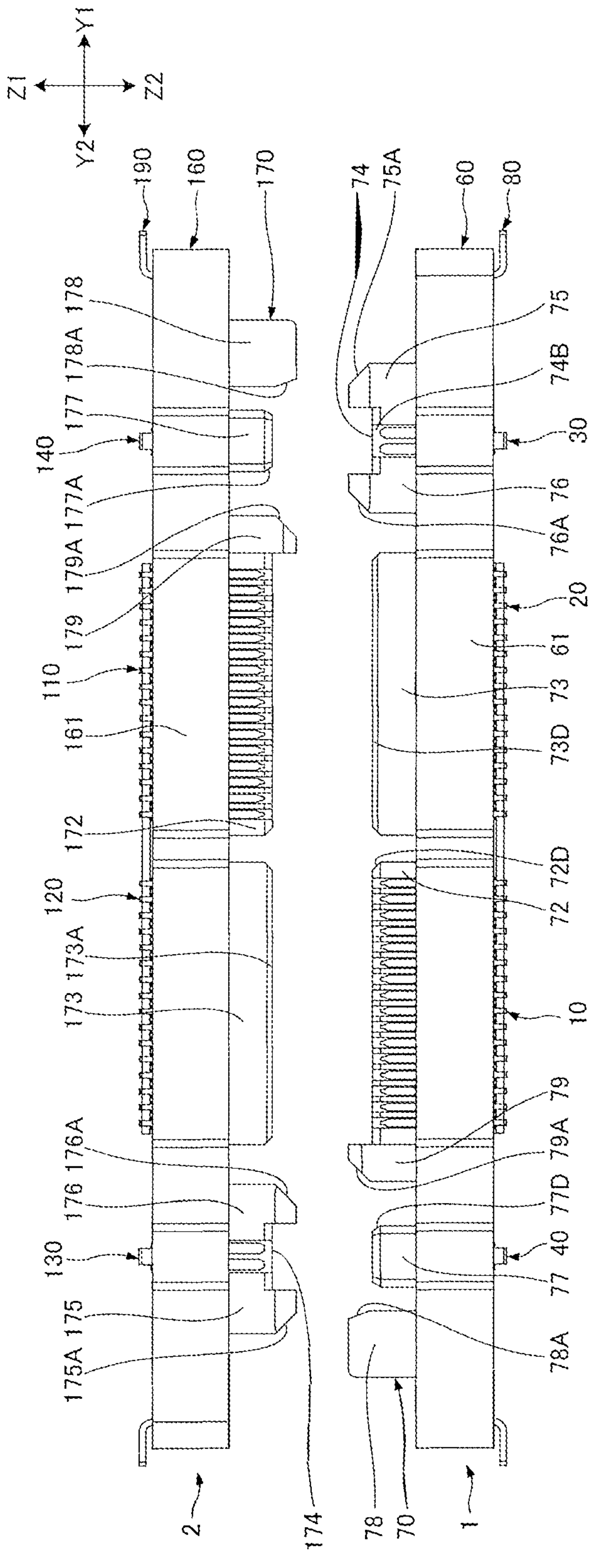
Figure 3B:
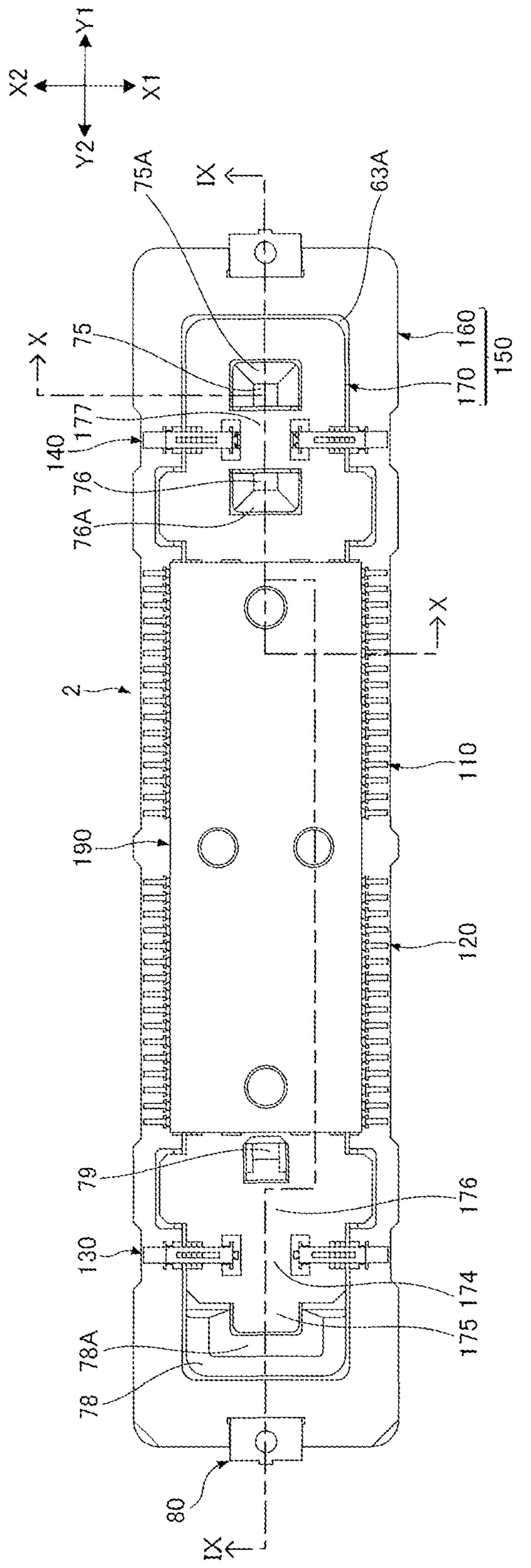
Figure 4:
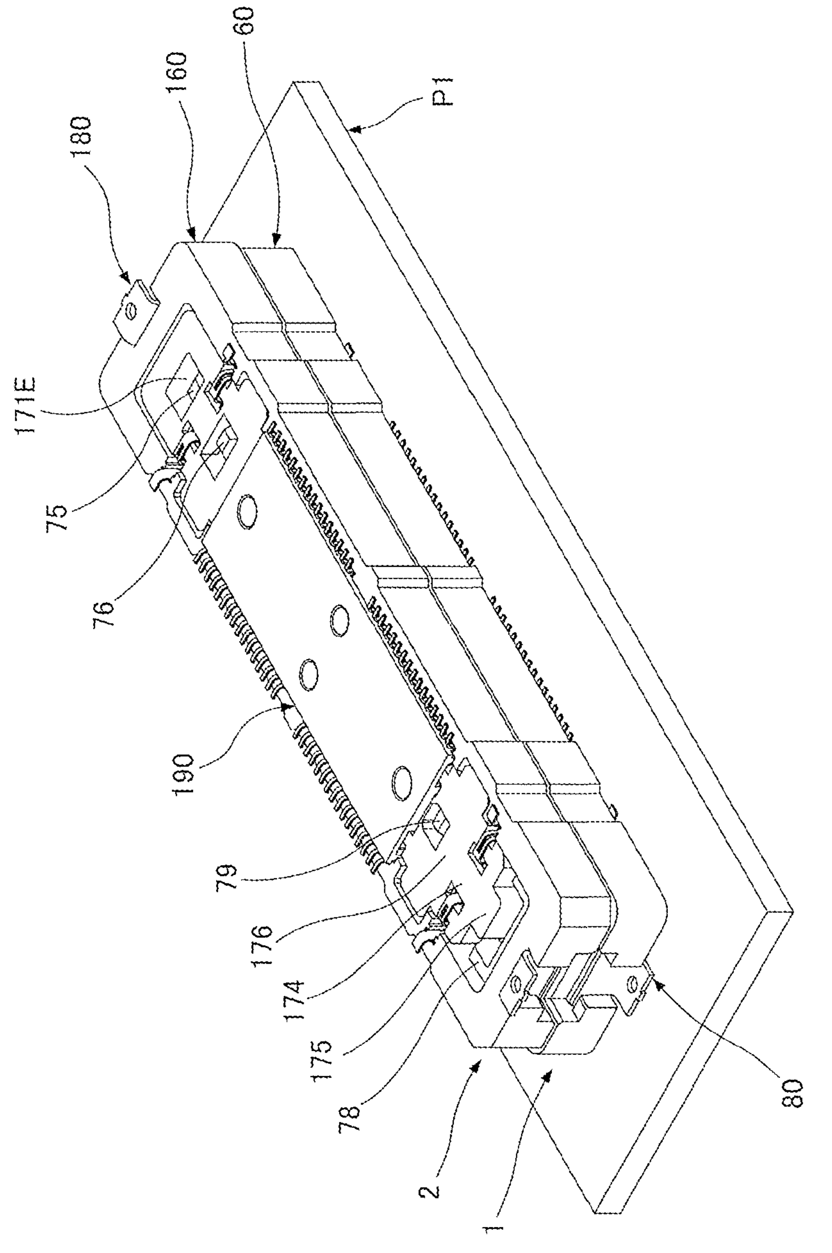
FIG. 4 is a perspective view of the electrical connector for circuit boards and counterpart connector of FIG. 1, showing a state after mating connection as seen obliquely from above.
Figure 5:
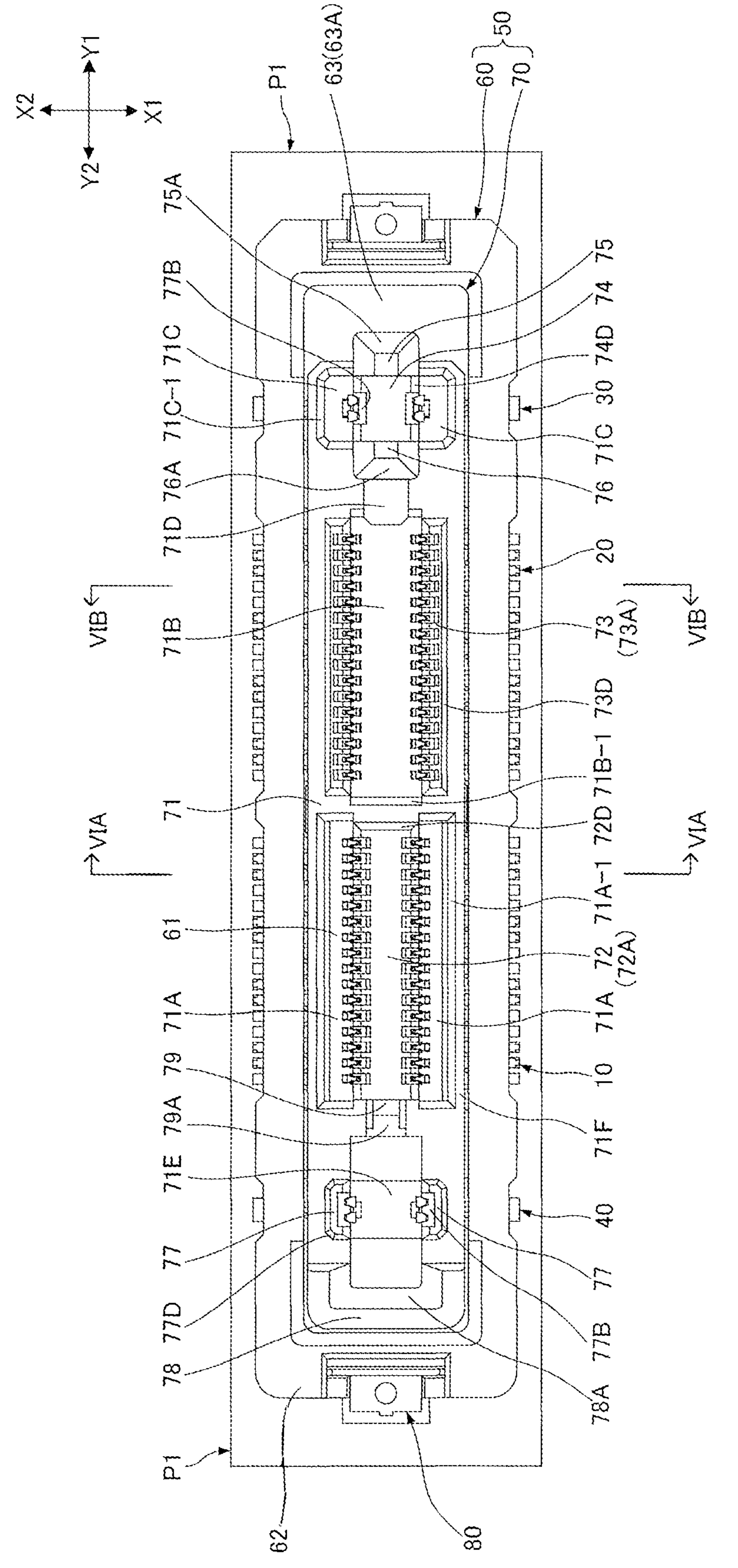
FIG. 5 is a plan view of the electrical connector for circuit boards of FIG. 1.

FIGS. 1 to 3 are diagrams illustrating a state prior to mating connection of an electrical connector for circuit boards 1 according to an embodiment of the present invention (hereinafter referred to as "connector 1") and an electrical connector for circuit boards 2 serving as a counterpart connector (counterpart connector body) (hereinafter referred to as "counterpart connector 2"), wherein FIG. 1 is a perspective view taken obliquely from above, FIG. 2 is a perspective view taken obliquely from below, FIG. 3(A) is a lateral view, and FIG. 3(B) is a plan view. FIG. 4 is a perspective view illustrating the connector 1 and counterpart connector 2 in a state after mating connection as seen obliquely from above. FIG. 5 is a plan view of the connector 1 of FIG. 1.

Figure 6A:
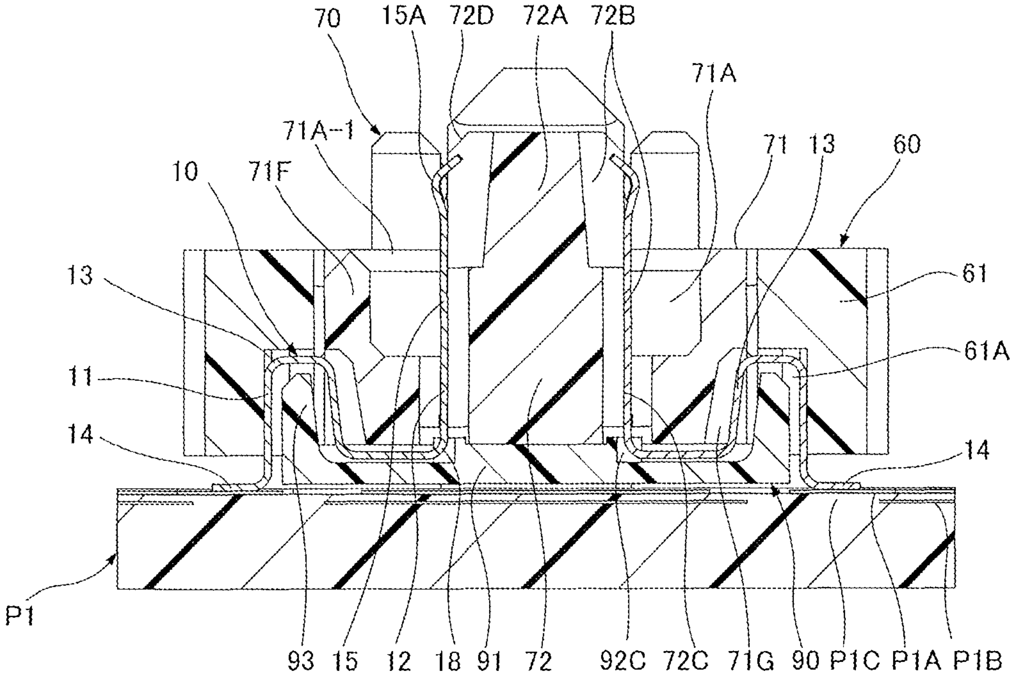
FIG. 6(A) is a cross-sectional view along line VIA-VIA in FIG. 4.
Figure 6B:
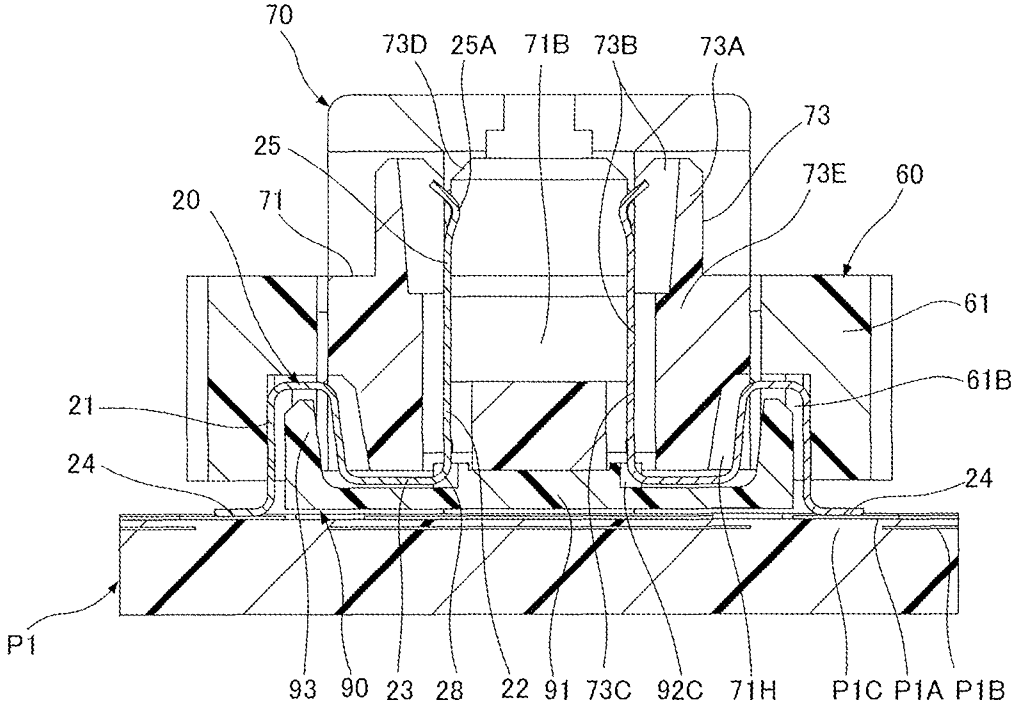
FIG. 6(B) is a cross-sectional view along line VIB-VIB in FIG. 4.

FIGS. 6(A) and 6(B) shows cross-sectional views taken in a plane perpendicular to the terminal array direction of the connector 1 and counterpart connector 2 illustrated in FIG. 4. Specifically, FIG. 6(A), which is a cross-sectional view along line VIA-VIA in FIG. 4, shows a cross-section taken at the location of the hereinafter-described first signal terminals 10 in the terminal array direction, and FIG. 6(B), which is a cross-sectional view along line VIB-VIB in FIG. 4, shows a cross-section taken at the location of the hereinafter-described second signal terminals 20 in the terminal array direction. In FIGS. 1, 4, 5, 6(A) and 6(B), the connector 1 is shown mounted on the mounting face of a circuit board, P1. In FIG. 2, the counterpart connector 2 is shown mounted on the mounting face of another circuit board, P2.

As shown in FIGS. 1, 4, 5, 6(A) and 6(B), the connector 1 is an electrical connector for circuit boards mounted on the mounting face of a circuit board, P1. In addition, the counterpart connector 2 is an electrical connector for circuit boards mounted on the mounting face of another circuit board, P2. Arranged in an orientation in which the mounting faces of the circuit boards P1, P2 are parallel, the connector 1 and counterpart connector 2 are matingly connected to form an electrical connector assembly such that the direction of connection of the connectors is a vertical direction (Z-axis direction) normal to the mounting faces. In the present embodiment, the counterpart connector 2 is adapted to be matingly connected to the connector 1 from above.

The connector 1 and counterpart connector 2 are so-called hermaphroditic connectors identical in shape to each other. As shown in FIGS. 1 to 4, the counterpart connector 2 is matingly connected to the connector 1 from above in an orientation which, while being vertically inverted relative to the connector 1, is rotated 180° about an axial line passing through the center of the connector 1 as seen in the vertical direction. In the counterpart connector 2, reference numerals obtained by adding "100" to the reference numerals used for the connector 1 are assigned to sections corresponding to the respective components of the connector 1 described hereinbelow, and description thereof is omitted. It should be noted that while the discussion of the present embodiment assumes that the connector disposed on circuit board P1 is "connector 1" and the connector disposed on circuit board P2 is "counterpart connector 2," from the standpoint of the connector disposed on circuit board P2, the connector disposed on circuit board P1 is a counterpart connector.

As shown in FIGS. 1 to 5, the connector 1 has a plurality of signal terminals 10, 20 and power supply terminals 30, 40 (collectively referred to hereinbelow as "terminals 10, 20, 30, 40" where distinctions need not be drawn) arranged side by side such that the terminal array direction is a direction (Y-axis direction) parallel to the mounting face of circuit board P1, a housing 50 retaining the plurality of terminals 10, 20, 30, 40, anchor fittings 80 retained at the opposite ends of the housing 50 in the terminal array direction, and a cover member 90 attached to the housing 50 from below.

The housing 50, which is made of plastics (e.g., made of synthetic plastics), has a stationary housing 60 secured to circuit board P1 through the medium of the terminals 10, 20, 30, 40, and a movable housing 70 capable of relative motion with respect to the stationary housing 60. The terminals 10, 20, 30, 40 are provided spanning between the stationary housing 60 and movable housing 70. The connector 1 is a so-called floating connector, in which motion of the movable housing 70 with respect to the stationary housing 60 is permitted by resilient deformation of the terminals 10, 20, 30, 40. In the present embodiment, the movable housing 70 can move in three directions, i.e., in the connector width direction (X-axis direction), in the terminal array direction (Y-axis direction), and in the vertical direction (Z-axis direction).

The signal terminals 10, 20 include first signal terminals 10 and second signal terminals 20, which differ in shape from each other. The power supply terminals 30, 40 include first power supply terminals 30 and second power supply terminals 40, which differ in shape from each other. As shown in FIG. 1, the first signal terminals 10 are arranged in two rows within a range leaning toward the Y2 side in the intermediate area in the terminal array direction (Y-axis direction) of the housing 50. As shown in FIG. 1, the second signal terminals 20 are arranged in two rows within a range leaning toward the Y1 side in the intermediate area in the terminal array direction of the housing 50. The signal terminals 10, 20 arranged in two rows are opposed in a symmetrical orientation in the connector width direction (X-axis direction) (see also FIGS. 6(A) and 6(B)).

A pair of first power supply terminals 30 are provided at the end of the housing 50 on the Y1 side in the terminal array direction (Y-axis direction). A pair of second power supply terminals 40 are provided at the end of the housing 50 on the Y2 side in the terminal array direction. In pairs of first power supply terminals 30 and pairs of second power supply terminals 40, the respective power supply terminals 30, 40 in each pair are opposed in a symmetrical orientation in the connector width direction (X-axis direction) direction.

Figure 7A:
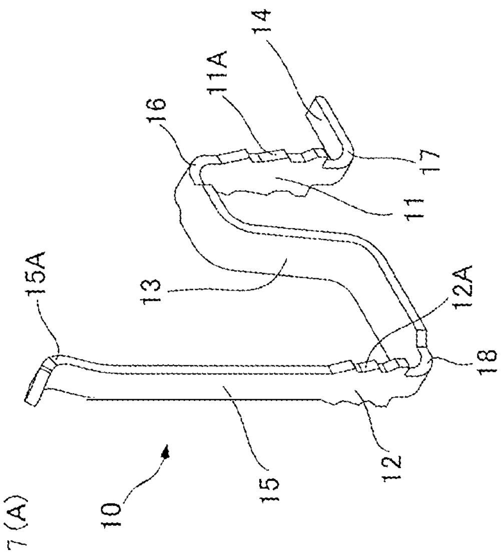
Figure 7B:
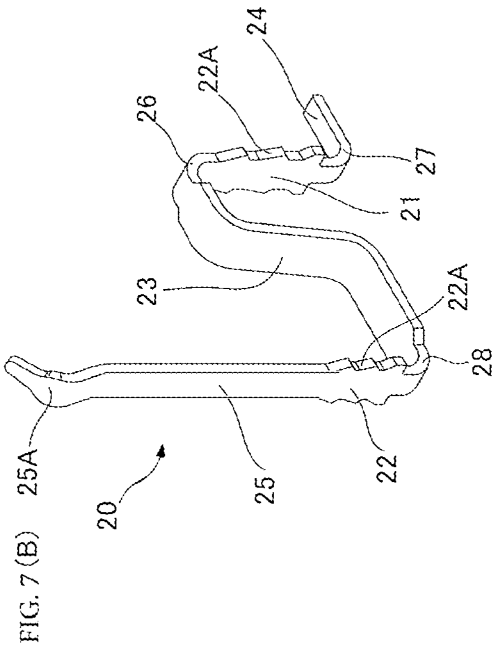
Figure 7C:
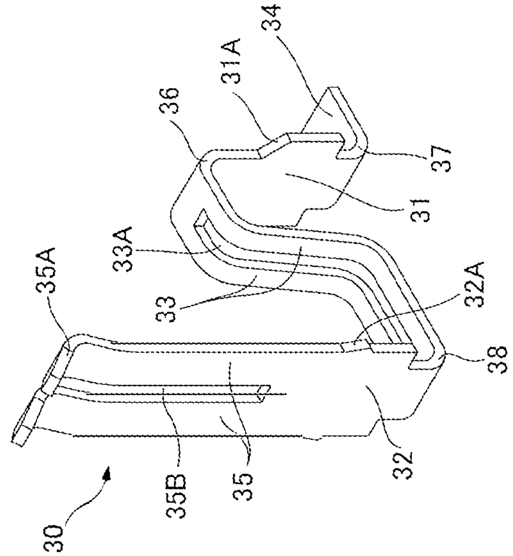
Figure 7D:
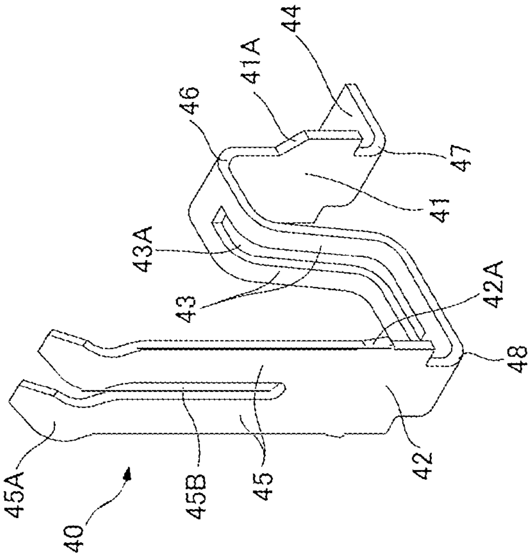

FIGS. 7(A) to 7(D) shows perspective views illustrating each terminal 10, 20, 30, 40 in isolation, wherein FIG. 7(A) illustrates a first signal terminal 10, FIG. 7(B) illustrates a second signal terminal 20, FIG. 7(C) illustrates a first power supply terminal 30, and FIG. 7(D) illustrates a second power supply terminal 40. As shown in FIGS. 7(A) to 7(D), the terminals 10, 20, 30, 40, which are formed by bending metal strip-like pieces in the through-thickness direction, have stationary-side retained portions 11, 21, 31, 41, which are retained in the stationary housing 60, movable-side retained portions 12, 22, 32, 42, which are retained in the movable housing 70, resilient portions 13, 23, 33, 43, which are located between the stationary-side retained portions 11, 21, 31, 41 and movable-side retained portions 12, 22, 32, 42 and are capable of resilient deformation, connection portions 14, 24, 34, 44, which extend from the stationary-side retained portions 11, 21, 31, 41 and are solder-connectable to circuit board P1, and contact arm portions 15, 25, 35, 45, which extend from the movable-side retained portions 12, 22, 32, 42 and can make contact with the counterpart connector 2. In other words, the terminals 10, 20, 30, 40 are configured such that the connection portions 14, 24, 34, 44 and contact arm portions 15, 25, 35, 45 are coupled by intermediate portions, and said intermediate portions have stationary-side retained portions 11, 21, 31, 41, movable-side retained portions 12, 22, 32, 42, and resilient portions 13, 23, 33, 43.

In addition, as shown in FIGS. 7(A) to 7(D), the resilient portions 13, 23, 33, 43 and the top ends of the stationary-side retained portions 11, 21, 31, 41 are coupled via the bend portions 16, 26, 36, 46, the connection portions 14, 24, 34, 44 and the bottom ends of the stationary-side retained portions 11, 21, 31, 41 are coupled via the bend portions 17, 27, 37, 47, and resilient portions 13, 23, 33, 43 and the bottom ends of the movable-side retained portions 12, 22, 32, 42 are coupled via the bend portions 18, 28, 38, 48.

Prior to describing the terminals 10, 20, 30, 40, the configuration of the stationary housing 60 and movable housing 70 will be described with reference to FIGS. 1 to 5. As shown in FIG. 1, the stationary housing 60 has a pair of lateral wall portions 61 extending in the terminal array direction (Y-axis direction) and a pair of end wall portions 62 that extend in the connector width direction (X-axis direction) and couple the end portions of the pair of lateral wall portions 61, with the pair of lateral wall portions 61 and the pair of end walls portions 62 forming a peripheral wall. The space enclosed within this peripheral wall and disposed therethrough in the vertical direction forms a central space 63 accommodating a portion of the movable housing 70. In addition, on the Y1 side in the terminal array direction (Y-axis direction), the central space 63 has an end receiving portion 63A receiving the hereinafter-described second outer guide portion 178 of the counterpart connector 2 from above.

As shown in FIG. 1, in the intermediate area in the terminal array direction (Y-axis direction), the lateral wall portions 61 press-fittingly retain the stationary-side retained portions 11 of the first signal terminals 10 within a range leaning toward the Y2 side (see FIG. 6(A)) and press-fittingly retain the stationary-side retained portions 21 of the second signal terminals 20 within a range leaning toward the Y1 side (see FIG. 6(B)). Specifically, as shown in FIG. 6(A), groove-shaped stationary-side retaining portions 61A used to accommodate the stationary-side retained portions 11 and a portion of the resilient portions 13 of the first signal terminals 10 are recessed from the interior lateral faces (surfaces perpendicular to the connector width direction) of the lateral wall portions 61 while being formed in a downwardly open configuration in the bottom portion of the lateral wall portions 61 within the range of the lateral wall portions 61 leaning toward the Y2 side. Further, as shown in FIG. 6(B), groove-shaped stationary-side retaining portions 61B used to accommodate the stationary-side retained portions 21 and a portion of the resilient portions 23 of the second signal terminals 20 are recessed from the interior lateral faces (surfaces perpendicular to the connector width direction) of the lateral wall portions 61 while being formed in a downwardly open configuration in the bottom portion of the lateral wall portions 61 within the range of the lateral wall portions 61 leaning toward the Y1 side. The stationary-side retaining portions 61A, 61B respectively press-fittingly retain the stationary-side retained portions 11, 21.

In addition, as shown in FIG. 1, the lateral wall portions 61 press-fittingly retain the stationary-side retained portions 31 (see FIG. 7(C)) of the first power supply terminals 30 at the end on the Y1 side in the terminal array direction (Y-axis direction), and press-fittingly retain the stationary-side retained portions 41 (see FIG. 7(D)) of the second power supply terminals 40 at the end on the Y2 side. Specifically, stationary-side terminal groove portions (not shown) used to accommodate the stationary-side retained portions 31 and a portion of the resilient portions 33 of the first power supply terminals 30 are formed at the end of the lateral wall portions 61 on the Y1 side, and stationary-side terminal groove portions (not shown) used to accommodate the stationary-side retained portions 41 and a portion of the resilient portions 43 of the second power supply terminals 40 are formed at the end on the Y2 side. These stationary-side retaining portions respectively press-fittingly retain the stationary-side retained portions 31, 41. Although these stationary-side terminal groove portions are shaped as grooves similar to the stationary-side retaining portions 61A, 61B, they differ from the stationary-side retaining portions 61A, 61B in that they are formed of a slightly greater width.

In the end wall portions 62, groove-shaped fitting retaining portions 62A used to press-fittingly retain anchor fittings 80 are recessed from the outer end faces of the end wall portions 62 and formed extending through the end wall portions 62 in the vertical direction.

In the movable housing 70, a base portion 71 of a generally rectangular parallelepiped-like external shape, which constitutes the bottom portion thereof and extends longitudinally in the terminal array direction, is accommodated within the central space 63 of the stationary housing 60. As shown in FIG. 5, the base portion 71 is located within the central space 63 while maintaining a clearance from the interior surfaces of the stationary housing 60 (the interior surfaces of the lateral wall portions 61 and the interior surfaces of the end wall portions 62). The movable housing 70 can move bi-directionally in the connector width direction (X-axis direction) and in the terminal array direction (Y-axis direction) within the bounds of this clearance. As shown in FIG. 5, the clearance between the base portion 71 and the end wall portion 62 of the stationary housing 60 on the Y1 side in the terminal array direction is larger than the clearances at other locations, with this clearance constituting the end receiving portion 63A. In addition, the base portion 71 is formed to substantially the same dimensions in the vertical direction as the stationary housing 60, and the top face of said base portion 71 is located at the same height in the vertical direction as the top face of the stationary housing 60.

As shown in FIG. 5, in the intermediate area in the terminal array direction (Y-axis direction), two first intermediate aperture portions 71A are formed in the base portion 71 within a range leaning toward the Y2 side and one second intermediate aperture portion 71B is formed within a range leaning toward the Y1 side. The first intermediate aperture portions 71A, one of which is formed on each opposite side of the hereinafter-described first signal terminal placement portion 72 in the connector width direction, extend over the array range of the first signal terminals 10 while extending through the base portion 71 in the vertical direction. Final guiding portions 71A-1 used to guide the opposing wall portions 173E of the hereinafter-described second signal terminal placement portions 173 of the counterpart connector 2 toward the regular mating position are formed in the edge portions of the top end portions of the first intermediate aperture portions 71A. The final guiding portions 71A-1 are inclined faces obtained by chamfering the edge portions of the top end portions of the first intermediate aperture portions 71A.

Support wall portions 71F are formed on the base portion 71 outwardly of the first signal terminal placement portion 72 and first intermediate aperture portions 71A in the connector width direction. The support wall portions 71F, which extend across the range of the first signal terminal placement portion 72 in the terminal array direction, are part of the wall portions forming the first intermediate aperture portions 71A. When the connectors are in a mated state, the support wall portions 71F are placed in surface contact with the exterior lateral faces of the opposing wall portions 173E of the counterpart connector 2 and can externally support the opposing wall portions 173E in the connector width direction (see FIG. 12(B)).

The second intermediate aperture portion 71B, which is formed between the two opposing wall portions 73E of the hereinafter-described second signal terminal placement portions 73 in the connector width direction, extends over the array range of the second signal terminals 20 while extending through the base portion 71 in the vertical direction. Final guiding portions 71B-1 used to guide the hereinafter-described first signal terminal placement portion 172 of the counterpart connector 2 toward the regular mating position are formed in the edge portion of the top end portion of the second intermediate aperture portion 71B. The final guiding portions 71B-1 are inclined faces obtained by chamfering the edge portion of the top end portion of the second intermediate aperture portion 71B.

In addition, two first end aperture portions 71C and one inner end aperture portion 71D are formed in the base portion 71 at the end on the Y1 side in the terminal array direction (Y-axis direction), and one second end aperture portion 71E is formed at the end on the Y2 side in the terminal array direction (Y-axis direction). The first end aperture portions 71C, one of which is formed on each opposite side of the hereinafter-described first power supply terminal placement portion 74 in the connector width direction, extend through the base portion 71 in the vertical direction within a range including the first power supply terminal placement portion 74 in the terminal array direction.

Final guiding portions 71C-1 used to guide the hereinafter-described second power supply terminal placement portions 177 of the counterpart connector 2 toward the regular mating position are formed in the edge portions of the top end portions of the first end aperture portions 71C. The final guiding portions 71C-1 are inclined faces obtained by chamfering the edge portions of the top end portions of the first end aperture portions 71C.

As shown in FIG. 5, the inner end aperture portion 71D is located in the central area in the connector width direction as well as between the second intermediate aperture portion 71B and the hereinafter-described first inner guide portion 76 in the terminal array direction. The inner end aperture portion 71D is placed in communication with the second intermediate aperture portion 71B while extending through the base portion 71 in the vertical direction.

As shown in FIG. 5, the second end aperture portion 71E, as seen in the vertical direction, is partially surrounded by the hereinafter-described second power supply terminal placement portions 77, second outer guide portion 78, and second inner guide portion 79, and extends through the base portion 71 in the vertical direction within a range including the second power supply terminal placement portions 77 in the terminal array direction.

As shown in FIG. 6(A), in the bottom portion of the base portion 71, in the intermediate area in the terminal array direction (Y-axis direction), holding groove portions 71G used to accommodate a portion of the resilient portions 13 of the first signal terminals 10 are formed within a range leaning toward the Y2 side, and, as shown in FIG. 6(B), holding groove portions 71H used to accommodate a portion of the resilient portions 23 of the second signal terminals 20 are formed within a range leaning toward the Y1 side. The holding groove portions 71G, 71H are recessed from the exterior lateral faces of the base portion 71 (surfaces perpendicular to the connector width direction) and are formed in a downwardly open configuration.

In addition, in the bottom portion of the base portion 71, holding groove portions (not shown) used to accommodate a portion of the resilient portions 33 of the first power supply terminals 30 are formed at the end on the Y1 side in the terminal array direction (Y-axis direction), and holding groove portions (not shown) used to accommodate a portion of the resilient portions 43 of the second power supply terminals 40 are formed at the end on the Y2 side. These holding groove portions are similar in shape to the holding groove portions 71G, 71H.

In the intermediate area in the terminal array direction (Y-axis direction), the movable housing 70 has a first signal terminal placement portion 72 within a range leaning toward the Y2 side, and second signal terminal placement portions 73 within a range leaning toward the Y1 side. As shown in FIG. 5, the first signal terminal placement portion 72 is located in the central area in the connector width direction, in other words, between the two first intermediate aperture portions 71A, with the top portion thereof constituting a protruding wall portion 72A extending upward from the top face of the base portion 71, and the bottom portion thereof forming part the base portion 71. Movable-side terminal groove portions 72B used for placement of the first signal terminals 10 are formed in a side-by-side arrangement in the terminal array direction in the exterior lateral faces on the opposite sides of the first signal terminal placement portion 72 in the connector width direction.

Figure 12A:
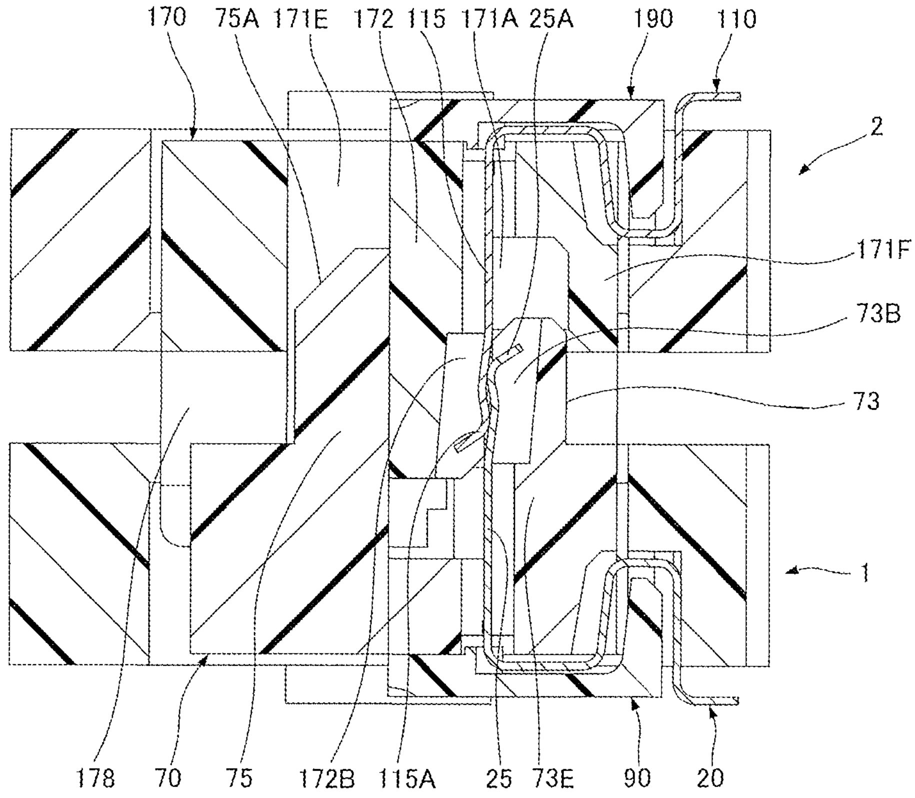

As shown in FIG. 6(A), the movable-side terminal groove portions 72B are shaped as grooves which, while being recessed from the aforementioned exterior lateral faces, extend in the vertical direction over a range extending from the location of the top end of the first signal terminal placement portion 72 to a location slightly downward of the top face of the base portion 71. As shown in FIG. 6(A), the movable-side terminal groove portions 72B are recessed from the aforementioned exterior lateral faces and have a groove-like configuration extending in the vertical direction over a range extending across the top portion of the base portion 71, protruding wall portion 72A, and part of a range corresponding to the contact arm portions 15 of the first signal terminals 10 in the vertical direction. As shown in FIG. 6(A), the movable-side terminal groove portions 72B, which are formed as grooves whose top portion is deeper than the bottom portion, are adapted to permit resilient deformation of the contact arm portions 15 of the first signal terminals 10 within these deep grooves (see FIGS. 12(A) and 12(B)). The wall thickness dimensions of the first signal terminal placement portion 72 at locations corresponding to the bottom portion of the movable-side terminal groove portions 72B are larger than the wall thickness dimensions at locations corresponding to the top portion of the movable-side terminal groove portions 72B. In addition, at locations corresponding to the top portion of the movable-side terminal groove portions 72B, the wall thickness dimensions (dimensions in the connector width direction) of the first signal terminal placement portion 72 become gradually larger as one moves downwardly.

In addition, movable-side retaining portions 72C accommodating and retaining the movable-side retained portions 12 of the first signal terminals 10 are formed below the movable-side terminal groove portions 72B. The movable-side retaining portions 72C are shaped as grooves which, while being recessed from the exterior lateral faces of the first signal terminal placement portion 72, extend in the vertical direction over a range extending from the locations of the bottom ends of the movable-side terminal groove portions 72B to the location of the bottom end of the base portion 71. The movable-side retaining portions 72C are grooves having the same depth as the bottom portion of the movable-side terminal groove portions 72B.

Final guiding portions 72D used to guide the opposing wall portions 173E of the hereinafter-described second signal terminal placement portions 173 of the counterpart connector 2 toward the regular mating position are formed in the edge portions of the top end portion of the protruding wall portion 72A. The final guiding portions 72D are inclined faces obtained by chamfering the edge portions of the top end portion of the protruding wall portion 72A.

As shown in FIGS. 5 and 6(B), the second signal terminal placement portions 73 are located on the opposite sides of the second intermediate aperture portion 71B in the connector width direction, with the top portion thereof constituting a protruding wall 73A extending upward from the top face of the base portion 71, and the bottom portion thereof forming part of the base portion 71. In the second signal terminal placement portions 73, part of the range corresponding to the contact arm portions 25 of the second signal terminals 20 in the vertical direction, i.e., part of the range extending across the protruding walls 73A and the top portion of the base portion 71, is formed as opposing wall portions 73E facing each other in the connector width direction. As shown in FIG. 6(B), movable-side terminal groove portions 73B used for placement of the second signal terminals 20 are formed in a side-by-side arrangement in the terminal array direction in the interior lateral faces of the opposing wall portions 73E.

As shown in FIG. 6(B), the movable-side terminal groove portions 73B are shaped as grooves which, while being recessed from the aforementioned interior lateral faces, extend over the range of the opposing wall portions 73E, i.e., the entire extent of the range corresponding to the contact arm portions 25 in the vertical direction. As shown in FIG. 6(B), the movable-side terminal groove portions 72B are formed as grooves whose top portion is deeper than the bottom portion and are adapted to permit resilient deformation of the contact arm portions 25 of the second signal terminals 20 within these deep grooves (see FIGS. 12(A) and 12(B)). The wall thickness dimensions of the bottom portion of the opposing wall portions 73E are larger than those of the top portion. In addition, at locations corresponding to the top portion of the movable-side terminal groove portions 73B, the wall thickness dimensions (dimensions in the connector width direction) of the opposing wall portions 73E become gradually larger as one moves downwardly.

In addition, movable-side retaining portions 73C accommodating and retaining the movable-side retained portions 22 of the second signal terminals 20 are formed below the movable-side terminal groove portions 73B. The movable-side retaining portions 73C are shaped as grooves which, while being recessed from the interior lateral faces of the second signal terminal placement portions 73, extend in the vertical direction over a range extending from the locations of the bottom ends of the movable-side terminal groove portions 73B to the location of the bottom end of the base portion 71. The movable-side retaining portions 73C are grooves having the same depth as the bottom portion of the movable-side terminal groove portions 73B.

Final guiding portions 73D used to guide the hereinafter-described first signal terminal placement portion 172 of the counterpart connector 2 toward the regular mating position are formed in the edge portions of the top end portions of the opposing wall portions 73E. The final guiding portions 73D are inclined faces obtained by chamfering the edge portions of the top end portions of the opposing wall portions 73E.

As shown in FIGS. 1 and 5, the movable housing 70 has a first power supply terminal placement portion 74, a first outer guide portion 75, and a first inner guide portion 76 at the end on the Y1 side in the terminal array direction (Y-axis direction), and has second power supply terminal placement portions 77, a second outer guide portion 78, and a second inner guide portion 79 at the end on the Y2 side. Below, the first outer guide portion 75 and first inner guide portion 76 are referred to collectively as the “first guide portions 75, 76” if there is no need to distinguish between them. In addition, the second outer guide portion 78 and second inner guide portion 79 are referred to collectively as the “second guide portions 78, 79” if there is no need to distinguish between them.

The first power supply terminal placement portion 74 is located in the central area in the connector width direction, in other words, between the two first end aperture portions 71C, with the top portion thereof extending upward from the top face of the base portion 71 and the bottom portion thereof forming part of the base portion 71. As shown in FIG. 3(A), the top end face of the first power supply terminal placement portion 74 is located at the same height in the vertical direction as the first signal terminal placement portion 72 and second signal terminal placement portions 73. Movable-side terminal groove portions 74B used for placement of the contact arm portions 35 of the first power supply terminals 30 are formed in the exterior lateral faces on the opposite sides of the first power supply terminal placement portion 74 in the connector width direction. The shape of the movable-side terminal groove portions 74B could be obtained by increasing the width of the movable-side terminal groove portions 72B of the previously discussed first signal terminal placement portion 72.

In addition, movable-side retaining portions (not shown) accommodating and retaining the movable-side retained portions 32 of the first power supply terminals 30 are formed below the movable-side terminal groove portions 74B. The shape of said movable-side retaining portions could be obtained by increasing the width of the movable-side retaining portions 72C of the previously discussed first signal terminal placement portion 72.

Final guiding portions 74D used to guide the hereinafter-described second power supply terminal placement portions 177 of the counterpart connector 2 toward the regular mating position are formed in the edge portions of the top end portion of the first power supply terminal placement portion 74. The final guiding portions 74D are inclined faces obtained by chamfering the edge portions of the top end portion of the first power supply terminal placement portion 74.

The first outer guide portion 75 is located outwardly of the first power supply terminal placement portion 74 in the terminal array direction and is coupled to the first power supply terminal placement portion 74. As shown in FIG. 5, when seen from above, the first outer guide portion 75 protrudes from the end face of the movable housing 70 on the Y1 side in the terminal array direction and is located in the end receiving portion 63A. The top portion of the first outer guide portion 75 extends upward from the top face of the base portion 71, and the bottom portion thereof forms part of the base portion 71. In addition, as shown in FIG. 3(A), the top end portion of the first outer guide portion 75 protrudes upwardly of the first power supply terminal placement portion 74. Preliminary guiding portions 75A used to guide the hereinafter-described second outer guide portion 178 of the counterpart connector 2 toward the regular mating position are formed in the edge portions of the top end portion of this first outer guide portion 75. The preliminary guiding portions 75A are inclined faces obtained by chamfering the edge portions of the top end portion of the first outer guide portion 75. The dimensions of the inclined faces of the preliminary guiding portions 75A in the direction of inclination are larger than those of the final guiding portions 71A-1, 71B-1, 71C-1, 72D, and 73D.

The first inner guide portion 76 is located inwardly of the first power supply terminal placement portion 74 in the terminal array direction and is coupled to the first power supply terminal placement portion 74. The top portion of the first inner guide portion 76 extends upward from the top face of the base portion 71, and the bottom portion thereof forms part of the base portion 71. In addition, as shown in FIG. 3(A), the top end portion of the first inner guide portion 76 protrudes upwardly of the first power supply terminal placement portion 74. Preliminary guiding portions 76A used to guide the hereinafter-described second inner guide portion 179 of the counterpart connector 2 toward the regular mating position are formed in the edge portion of the top end portion of this first inner guide portion 76. The preliminary guiding portions 76A are inclined faces obtained by chamfering the edge portions of the top end portion of the first inner guide portion 76. The dimensions of the inclined faces of the preliminary guiding portions 76A in the direction of inclination are larger than those of the final guiding portions 71A-1, 71B-1, 71C-1, 72D, and 73D.

The second power supply terminal placement portions 77, one of which is provided on each opposite side of the second end aperture portion 71E in the connector width direction, have their top portion extending upward from the top face of the base portion 71 and their bottom portion forming part of the base portion 71. As shown in FIG. 3(A), the top end faces of the second power supply terminal placement portions 77 are located at the same height in the vertical direction as the first signal terminal placement portion 72 and second signal terminal placement portions 73. Movable-side terminal groove portions 77B used for placement of the contact arm portions 45 of the second power supply terminals 40 are formed in the interior lateral faces of the second power supply terminal placement portions 77 in the connector width direction, in other words, in the interior lateral faces of the two second power supply terminal placement portions 77 facing each other in the connector width direction. The shape of the movable-side terminal groove portions 77B could be obtained by increasing the width of the movable-side terminal groove portions 73B of the previously discussed second signal terminal placement portions 73.

In addition, movable-side retaining portions (not shown) accommodating and retaining the movable-side retained portions 42 of the second power supply terminals 40 are formed below the movable-side terminal groove portions 77B. The shape of said movable-side retaining portions could be obtained by increasing the width of the movable-side retaining portions 73C of the previously discussed second signal terminal placement portions 73.

Final guiding portions 77D used to guide the hereinafter-described first power supply terminal placement portion 174 of the counterpart connector 2 toward the regular mating position are formed in the edge portions of the top end portions of the second power supply terminal placement portions 77. The final guiding portions 77D are inclined faces obtained by chamfering the edge portions of the top end portions of the second power supply terminal placement portions 77.

The second outer guide portion 78 is located outwardly (on side Y2) of the second power supply terminal placement portions 77 in the terminal array direction. As shown in FIG. 5, the second outer guide portion 78, as seen from above, is of a U-shaped configuration that is open inwardly (on the Y1 side) in the terminal array direction, and has a section extending in the connector width direction (X-axis direction), and sections extending inwardly in the terminal array direction from the opposite ends in the connector width direction. The top portion of the second outer guide portion 78 extends upward from the top face of the base portion 71, and the bottom portion thereof forms part of the base portion 71. In addition, as shown in FIG. 3(A), the top end portion of the second outer guide portion 78 protrudes upwardly of the second power supply terminal placement portions 77. A preliminary guiding portion 78A used to guide the hereinafter-described first outer guide portion 175 of the counterpart connector 2 toward the regular mating position is formed in the edge portion of the top end portion of this second outer guide portion 78. The preliminary guiding portion 78A is an inclined face obtained by chamfering the edge portion of the top end portion of the second outer guide portion 78. The dimensions of the inclined face of the preliminary guiding portion 78A in the direction of inclination are larger than those of the final guiding portions 71A-1, 71B-1, 71C-1, 72D, and 73D.

The second inner guide portion 79, which is located inwardly (on the Y1 side) of the second power supply terminal placement portions 77, is coupled to the first signal terminal placement portion 72. The top portion of the second inner guide portion 79 extends upward from the top face of the base portion 71, and the bottom portion thereof forms part of the base portion 71. In addition, as shown in FIG. 3(A), the top end portion of the second inner guide portion 79 protrudes upwardly of the second power supply terminal placement portions 77. A preliminary guiding portion 79A used to guide the hereinafter-described first inner guide portion 176 of the counterpart connector 2 toward the regular mating position is formed in the edge portion of the top end portion of this second inner guide portion 79. The dimensions of the inclined face of the preliminary guiding portion 79A in the direction of inclination are larger than those of the final guiding portions 71A-1, 71B-1, 71C-1, 72D, and 73D.

As shown in FIG. 5, in the present embodiment, as seen from above, the second power supply terminal placement portions 77, second outer guide portion 78, and second inner guide portion 79 are located in the peripheral edge portion of the second end aperture portion 71E and partially surround said second end aperture portion 71E. When the connectors are matingly connected, these second power supply terminal placement portions 77, second outer guide portion 78, and second inner guide portion 79, as seen in the vertical direction, can partially surround the first power supply terminal placement portion 174, first outer guide portion 175, and first inner guide portion 176 of the counterpart connector 2.

As shown in FIG. 2, a plurality of attachment projections 70A for attaching the cover member 90 are provided on the bottom face of the base portion 71 of the movable housing 70. The attachment projections 70A are formed in the shape of downwardly protruding circular columns at a plurality of locations on the bottom face of the base portion 71.

Going back to the description of the terminals 10, 20, 30, 40, as shown in FIG. 6(A), in the first signal terminals 10, the stationary-side retained portions 11 extend in the vertical direction and, for the most part, except for the bottom end portion thereof, are accommodated within the stationary-side retaining portions 61A of the stationary housing 60, with the bottom end portions thereof projecting outside the stationary-side retaining portions 61A. As shown in FIG. 7(A), the stationary-side retained portions 11, on both lateral edges thereof, have a plurality of press-fitting projections 11A protruding outwardly in the terminal width direction, and are adapted to be press-fittingly retained within the stationary-side retaining portions 61A by the press-fitting projections 11A.

As shown in FIGS. 6(A) and 7(A), the resilient portions 13 extend from the top ends of the stationary-side retained portions 11 in a crank-like configuration. Specifically, after extending inwardly in the connector width direction from the top ends of the stationary-side retained portions 11 and projecting out of the stationary-side retaining portions 61A, the resilient portions 13 extend downwardly within the holding groove portions 71G and extend inwardly in the connector width direction along the bottom face of the base portion 71.

As shown in FIG. 6(A), the connection portions 14 extend outwardly in the connector width direction from the bottom ends of the stationary-side retained portions 11 along the bottom face of the stationary housing 60. The connection portions 14 are adapted to have their bottom faces solder-connected to the corresponding circuits P1A of the circuit board.

As shown in FIGS. 6(A) and 7(A), the movable-side retained portions 12 extend upwardly from the ends of the resilient portions 13 located internally in the connector width direction and, as shown in FIG. 7(A), are accommodated within the bottom portion of the movable-side retaining portions 72C. That is, the movable-side retained portions 12 are located inwardly of the stationary-side retained portions 11 in the connector width direction. As shown in FIG. 7(A), the movable-side retained portions 12, on both lateral edges thereof, have a plurality of press-fitting projections 12A protruding outwardly in the terminal width direction, and are adapted to be press-fittingly retained within the movable-side retaining portions 72C by the press-fitting projections 12A.

As shown in FIGS. 6(A) and 7(A), the contact arm portions 15 extend upwardly from the top ends of the movable-side retained portions 12 and, in the top end portions thereof, are provided with contact portions 15A bent in a manner to protrude outwardly in the connector width direction. The top portions of the contact arm portions 15 extend along the movable-side terminal groove portions 72B. The contact arm portions 15 are capable of resilient deformation in the through-thickness direction thereof, i.e., in the connector width direction. The contact arm portions 15 can make contact with the contact arm portions 115 of the first signal terminals 110 of the counterpart connector 2 under contact pressure using the contact portions 15A (see FIG. 12(B)).

The first signal terminals 10 are retained in the stationary housing 60 and movable housing 70 due to the fact that the stationary-side retained portions 11 are press-fitted into the stationary-side retaining portions 61A of the stationary housing 60 from below while the movable-side retained portions 12 are press-fitted into the movable-side retaining portions 72C of the movable housing 70 from below.

In the present embodiment, the first signal terminals 10 have formed therein a U-shaped section formed by the stationary-side retained portion 11 and a portion of the resilient portion 13. As shown in FIG. 6(A) and FIG. 7, etc., this U-shaped section, which is downwardly open, is an inverted U-shaped section. As shown in FIG. 7, the stationary-side retained portion 11 is formed such that the dimensions thereof in the terminal width direction are larger, i.e., it is formed of a greater width, than the bend portion 16, i.e., the coupling section coupled to the top end of said stationary-side retained portion 11, and the bend portion 17, i.e., the coupling section coupled to the bottom end of said stationary-side retained portion 11. In addition, the movable-side retained portion 12 is formed of a greater width than the bend portion 18, i.e., the coupling section coupled to the bottom end of said movable-side retained portion 12. In addition, the resilient portion 13 is formed of a greater width than the bend portion 16, i.e., the coupling section coupled to the outer end in the connector width direction, and the bend portion 18, i.e., the coupling section coupled to the inner end in the connector width direction.

As shown in FIGS. 6(B) and 7(B), the shape of the second signal terminals 20 would be obtained if the contact portions 15A of the first signal terminals 10 protruded toward the opposite side in the connector width direction. That is, the second signal terminals 20 are of the same shape as the first signal terminals 10 with the exception of the contact portions 25A. Here, parts of the second signal terminals 20 corresponding to the respective parts of the first signal terminals 10 are identified with reference numerals obtained by adding "10" to the reference numerals used for the first signal terminals 10, and description thereof is omitted. In addition, the second signal terminals 20 are press-fittingly attached to the stationary housing 60 and movable housing 70 from below in accordance with the same procedure as the first signal terminals 10.

As shown in FIG. 7(C), the shape of the first power supply terminals 30 could be obtained by increasing the width of the first signal terminals 10. In FIG. 7(C), parts of the first power supply terminals 30 corresponding to the respective parts of the first signal terminals 10 are identified with reference numerals obtained by adding "20" to the reference numerals used for the first signal terminals 10. In the first power supply terminals 30, the resilient portions 33, which have formed therein a slit 33A extending in the center in the terminal width direction over substantially the entire longitudinal range of the resilient portions 33, are two thin strips located on the opposite sides of said slit 33A. Providing the resilient portions 33 in the form of two thin strips in this manner makes the terminal width dimensions of each thin strip smaller, thereby making the resilient portions 33 more prone to resilient displacement.

The contact arm portions 35, which have formed therein a slit 35B extending in the center in the terminal width direction over substantially the entire longitudinal range of the contact arm portions 35, are two thin strips located on the opposite sides of said slit 35B. Providing the contact arm portions 35 in the form of two thin strips in this manner makes the terminal width dimensions of each thin strip smaller, thereby making the contact arm portions 35 more prone to resilient displacement. In addition, the stationary-side retained portions 31, on both lateral edges thereof, have press-fitting projections 31A protruding outwardly in the terminal width direction. The movable-side retained portions 32, on both lateral edges thereof, have press-fitting projections 32A protruding outwardly in the terminal width direction. The first power supply terminals 30 are press-fittingly attached to the stationary housing 60 and movable housing 70 from below in accordance with the same procedure as the first signal terminals 10.

As shown in FIG. 7(D), the shape of the second power supply terminals 40 would be obtained if the contact portions 35A of the first power supply terminals 30 protruded toward the opposite side in the connector width direction. That is to say, the second power supply terminals 40 are of the same shape as the first power supply terminals 30 with the exception of the contact portions 45A. Here, parts of the second power supply terminals 40 corresponding to the respective parts of the first power supply terminals 30 are identified with reference numerals obtained by adding "10" to the reference numerals used for the first power supply terminals 30, and description thereof is omitted. In addition, the second power supply terminals 40 are press-fittingly attached to the stationary housing 60 and movable housing 70 from below in accordance with the same procedure as the first signal terminals 10.

As shown in FIG. 1, the anchor fittings 80, which are formed by bending a sheet metal member in the through-thickness direction, have an L-shaped configuration as seen in the connector width direction. The anchor fittings 80 have retained portions 81 extending in the vertical direction, and securing portions 82 extending from the bottom ends of the retained portions 81 outwardly in the terminal array direction. The anchor fittings 80 are retained in the stationary housing 60 due to the fact that the retained portions 81 are press-fitted into the fitting retaining portions 62A of the stationary housing 60 from below. The securing portions 82 are secured with their bottom faces to the corresponding portions of the circuit board via solder connections.

Figure 8:
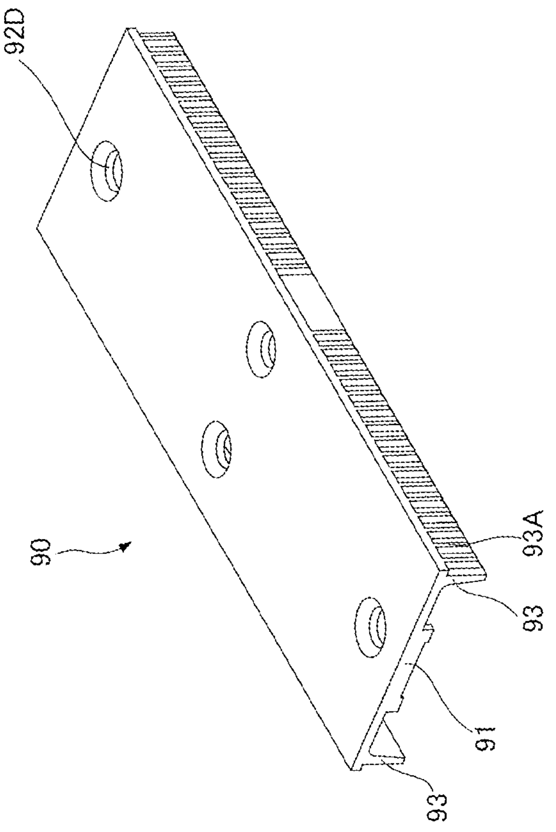
Figure 8:
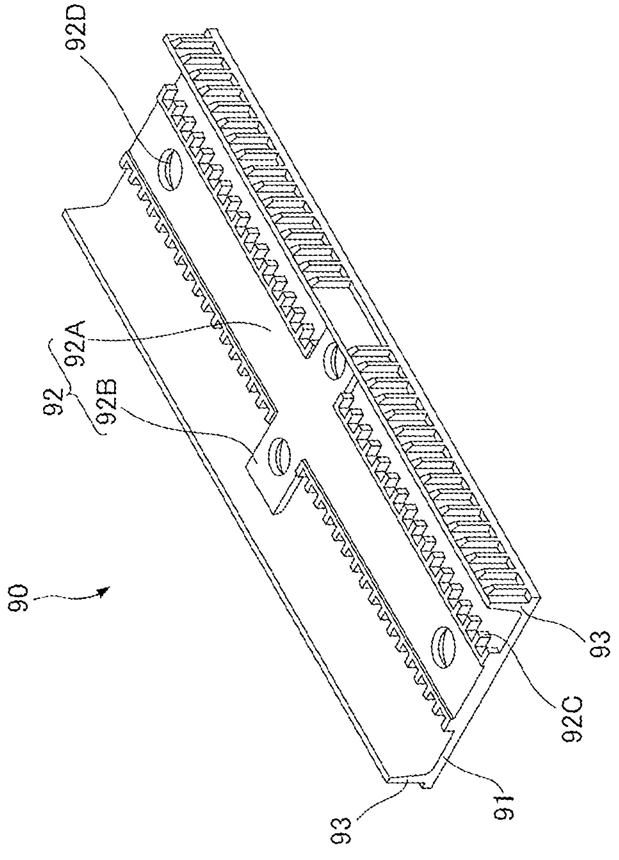
Figure 9:
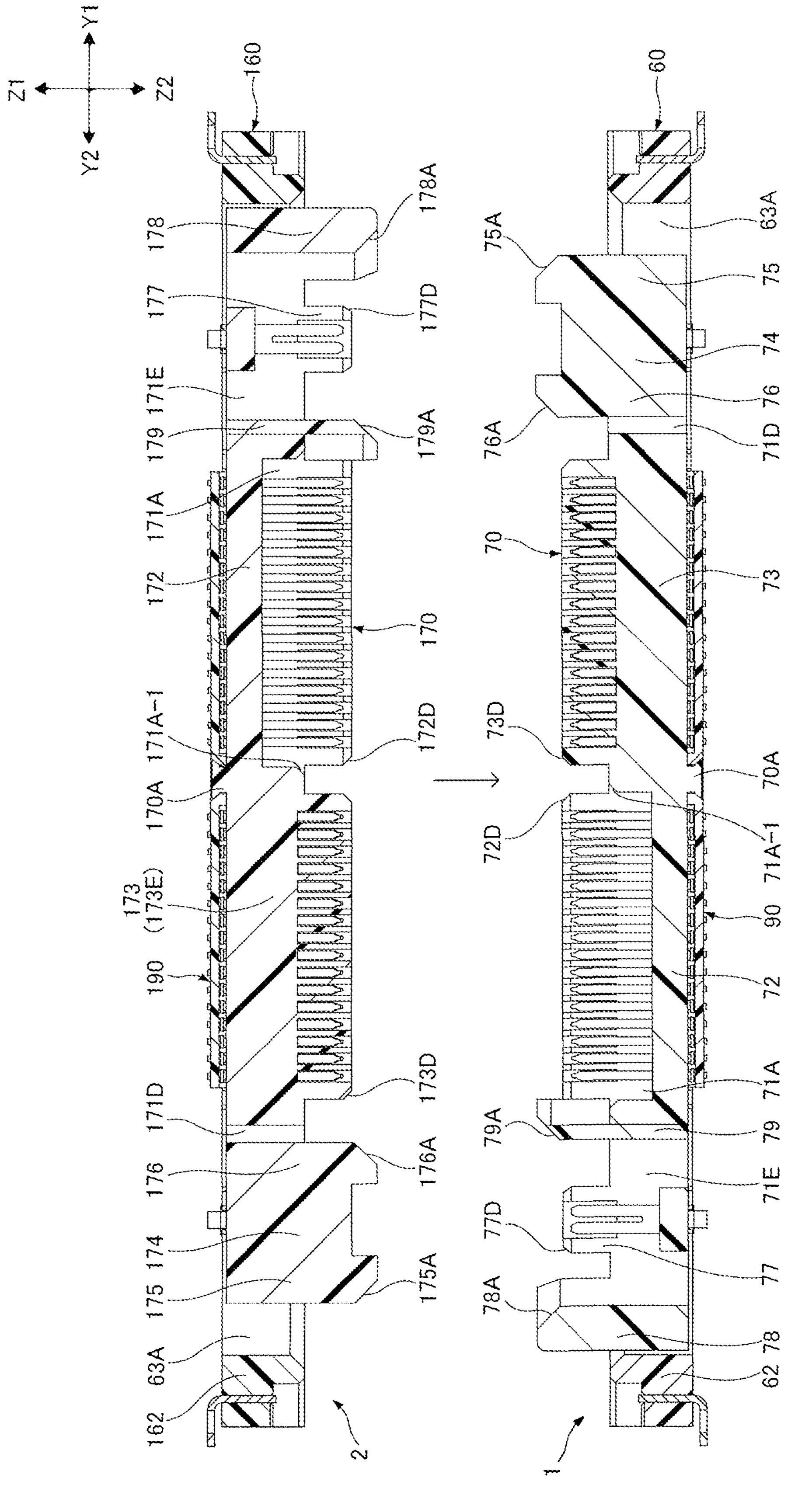
FIG. 9 is a cross-sectional view along line IX-IX in FIG. 3(B).
Figure 10:
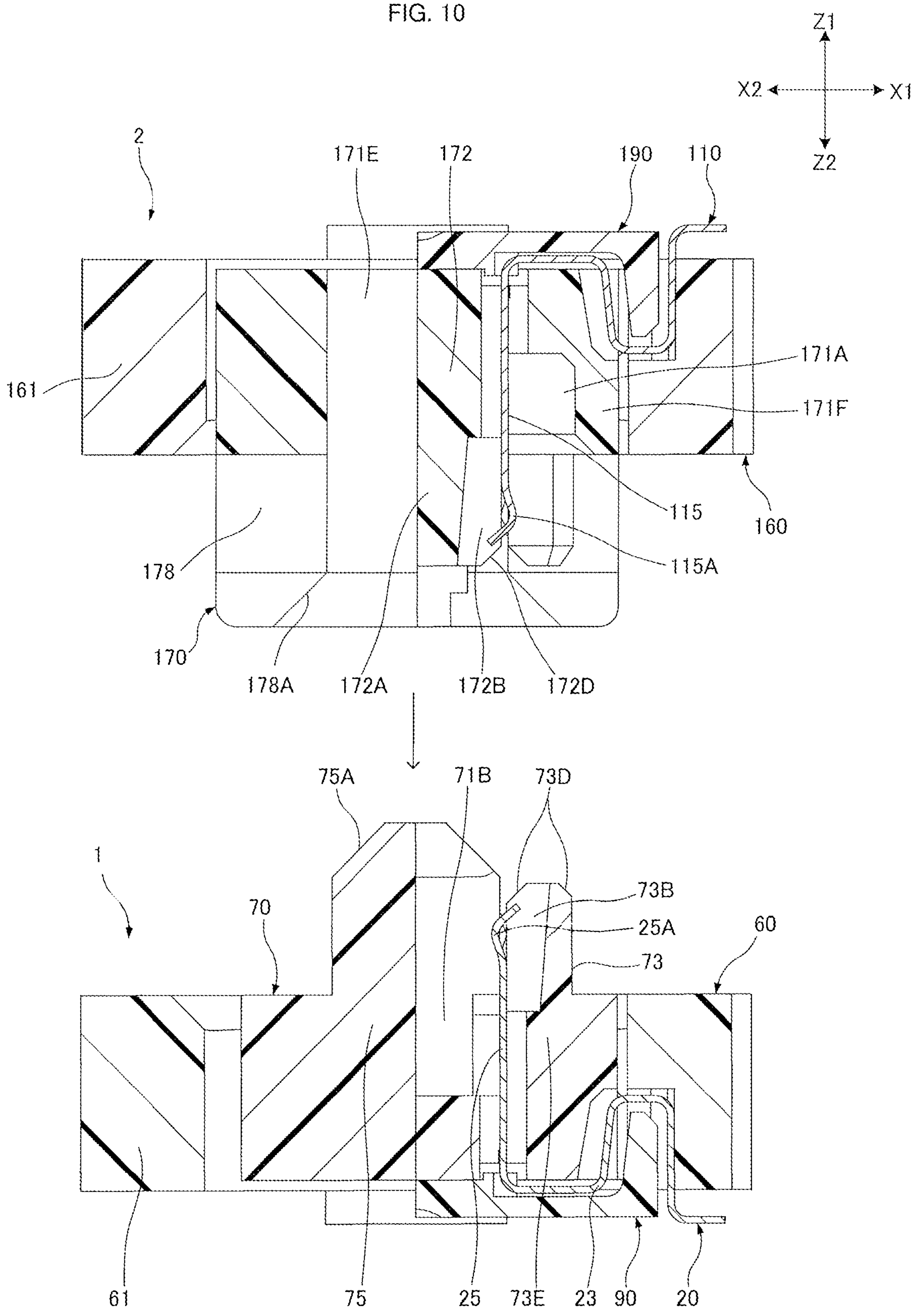
FIG. 10 is a cross-sectional view along line X-X in FIG. 3(B).
Figure 11:
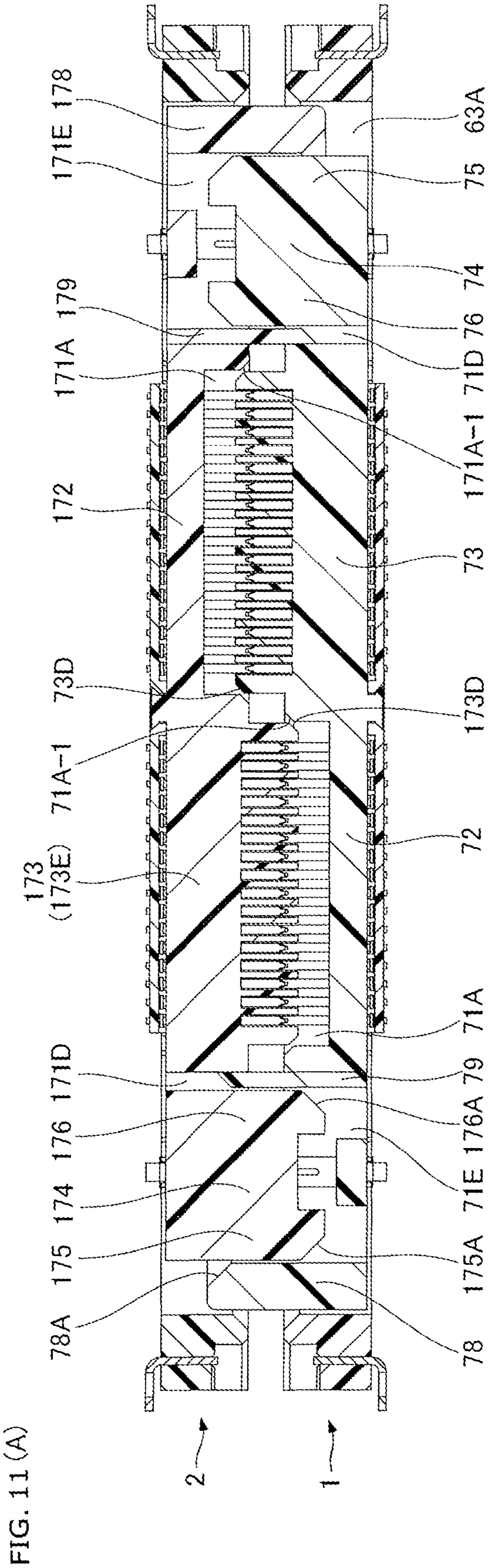
Figure 11:
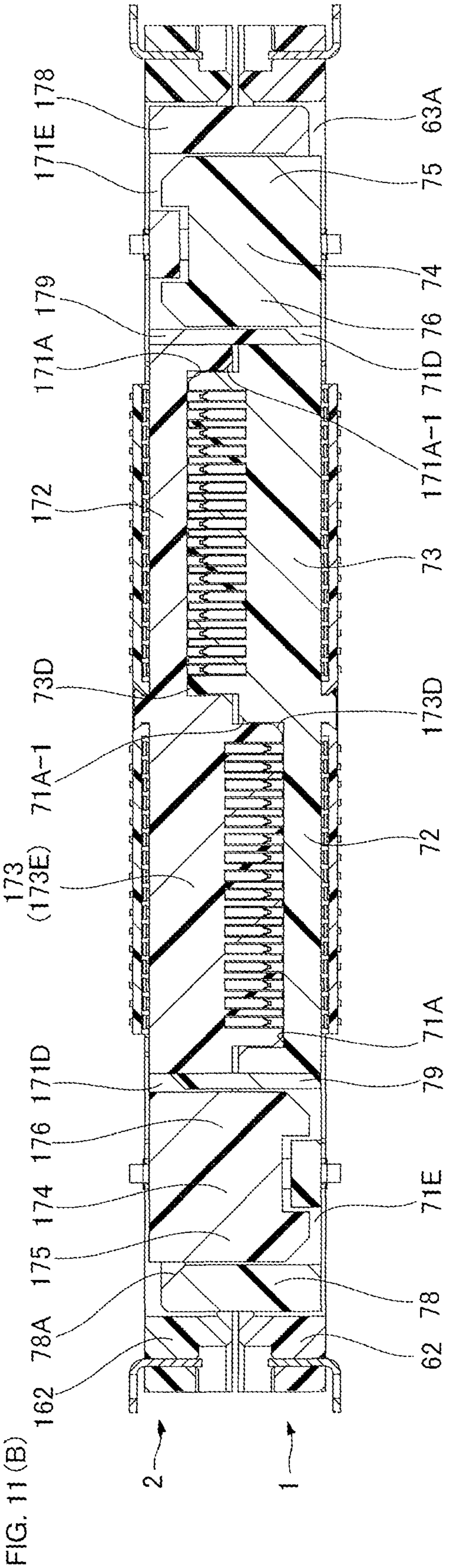

FIGS. 8(A) and 8(B) show perspective views illustrating the cover member 90 in isolation, wherein FIG. 8(A) is a perspective view illustrating an orientation used for attachment to the connector 1, and FIG. 8(B) a perspective view illustrating an orientation vertically inverted with respect to the orientation of FIG. 8(A). The cover member 90, which is made of plastics, has a plate-shaped main body portion 91 whose major faces extend in a direction perpendicular to the vertical direction, a protruding portion 92 protruding from the top face of the main body portion 91 in a cross-shaped configuration, and upright portions 93 rising upward from the opposite lateral edges of the main body portion 91 in the connector width direction while extending in the terminal array direction. Although in the present embodiment the cover member 90 is made of plastics, the material of the cover member 90 is not limited thereto and it may be made of any electrically insulating material; for example, it may be made of rubber.

The main body portion 91, whose longitudinal direction is the terminal array direction, extends in the terminal array direction over the array range of the first signal terminals 10 and second signal terminals 20 (see FIG. 2), and, in the connector width direction, over a range extending across the stationary-side retaining portions 61A, 61B of the two lateral wall portions 61 of the stationary housing 60 (see FIGS. 6(A) and 6(B)).

The protruding portion 92 has a long protruding portion 92A which extends in the central area in the connector width direction over the entire extent of the main body portion 91 in the terminal array direction, and a short protruding portion 92B which extends outwardly in the connector width direction from the lateral edges of the long protruding portion 92A in the central area of the long protruding portion 92A in the terminal array direction and which is coupled to the upright portions 93. Interior partition walls 92C protruding upwardly and outwardly in the connector width direction are formed at the opposite lateral edges of the long protruding portion 92A at the respective locations between adjacent first signal terminals 10 and between adjacent second signal terminals 20.

In addition, in the main body portion 91, attachment aperture portions 92D of a circular shape, as seen in the vertical direction, are formed extending through the main body portion 91 at the locations of the opposite ends of the long protruding portion 92A in the terminal array direction and at the locations of the opposite ends of the short protruding portion 92B in the connector width direction.

As shown in FIGS. 8(A) and 8(B), at the respective locations of the first signal terminals 10 and second signal terminals 20 in the terminal array direction, the upright portions 93 have exterior partition walls 93A that protrude outwardly in the connector width direction while extending in the vertical direction.

The cover member 90 is attached to the bottom face of the movable housing 70 such that the direction of attachment is an upwardly facing direction. That is to say, in the present embodiment, "up" is forward in the direction of attachment, and "down" is backward in the direction of attachment. When the cover member 90 is attached, the attachment projections 70A protruding from the bottom face of the movable housing 70 are inserted into the attachment aperture portions 92D of the cover member 90, and the distal end portions of said attachment projections 70A are deformed by heat swaging. As a result, the distal end portions of the attachment projections 70A become lockingly engaged with the peripheral edge portions of the attachment aperture portions 92D, thereby securing the cover member 90 to the bottom face of the movable housing 70. Therefore, the main body portion 91 of the cover member 90 is provided at the bottom end of the connector 1, i.e., at the rearward end in the aforementioned direction of attachment (proximal end in the aforementioned direction of attachment). Therefore, when attaching the cover member 90 to the movable housing 70, there is no need to perform the procedure of attachment of the cover member 90 on the forward side (far side) in the aforementioned direction of attachment, thereby making it possible to attach the cover member 90 in a simple and easy manner.

As shown in FIGS. 6(A) and 6(B), once the cover member 90 is attached to the bottom face of the movable housing 70, the bend portions 18, 28 of the signal terminals 10, 20 are accommodated between adjacent interior partition walls 92C. In addition, the upright portions 93 enter the respective inverted U-shaped sections of the signal terminals 10, 20 from below. Furthermore, the cover member 90 is not in contact with the signal terminals 10, 20 at least when the resilient portions 13, 23 of the signal terminals 10, 20 are in their free state.

When the cover member 90 is attached to the movable housing 70 in this manner, a range including part of the sections of the signal terminals 10, 20 that are exposed from the housing 50, more specifically, the resilient portions 13, 23, is covered when viewed from below. That is to say, a plastic layer is formed that covers the range including the resilient portions 13, 23 from below. Therefore, increases in characteristic impedance in the resilient portions 13, 23 are minimized, which makes characteristic impedance mismatches less likely to occur and, as a result, makes it possible to avoid degradation in the quality of signal transmission in terminals in an appropriate manner.

Due to the fact that terminal width dimensions abruptly change in the signal terminals 10, 20 in the coupling sections of the stationary-side retained portions 11, 21 and bend portions 16, 26 as well as in the coupling portions of the bend portions 16, 26 and resilient portions 13, 23, characteristic impedance mismatches are likely to occur in these coupling sections. In the present embodiment, the upright portions 93 are so provided as to enter the inverted U-shaped sections of the signal terminals 10, 20 along the aforementioned coupling sections. Therefore, it becomes easier to avoid the occurrence of characteristic impedance mismatches in the aforementioned coupling sections.

In addition, since the cover member 90 is not in contact with said resilient portions 13, 23 at least when the resilient portions 13, 23 of the signal terminals 10, 20 are in their free state, the cover member 90 becomes less likely to interfere with the resilient deformation of the resilient portions 13, 23. Therefore, the resilient portions 13, 23 can be easily resiliently deformed at a high level of deformation and, as a result, a sufficiently large degree of floating action can be ensured in the movable housing 70.

Although in the present embodiment the cover member 90 is attached to the movable housing 70, as an alternative, the cover member may be attached to the stationary housing and, in addition, may be attached to the terminals. In all instances, the cover member is preferably attached in a manner to avoid contact with the resilient portions at least when the resilient portions of the terminals are in their free state.

As shown in FIGS. 6(A) and 6(B), in the present embodiment, circuit board P1 has a ground layer P1B extending along the mounting face thereof. Although the ground layer P1B, as seen in the vertical direction, is formed extending over a range including most of the connector 1, there are empty areas P1C formed within ranges corresponding to the connection portions 14, 24 of the signal terminals 10, 20. Specifically, empty areas P1C having no ground layer P1B are formed as aperture portions including the connection portions 14, 24 at locations corresponding to each of the connection portions 14, 24, as seen in the vertical direction. That is to say, each connection portion 14, 24 is enclosed within the peripheral edges of the aperture portions of the ground layer P1B. In addition, circuit board P2, on which the counterpart connector 2 is mounted, has the same configuration as circuit board P1.

In this manner, due to the fact that empty areas P1C, in which there is no ground layer P1B, are formed on circuit board P1 within ranges corresponding to the connection portions 14, 24 of the signal terminals 10, 20, there is no metal layer and only the plastic layer of circuit board P1 is present at the locations where the connection portions 14, 24 are connected. Therefore, the characteristic impedance of the connection portions 14, 24 in the signal terminals 10, 20 can be brought closer to the characteristic impedance in sections other than the connection portions 14, 24, as a result of which it becomes easier to avoid the occurrence of characteristic impedance mismatches.

The thus configured connector 1 and the counterpart connector 2, which is identical in shape, are matingly connected in accordance with the following procedure. Hereinbelow, the operation of matingly connecting the connector 1 and counterpart connector 2 will be described with reference to FIGS. 1 to 4 and FIGS. 9 to 12.

First, the connector 1 is mounted on the mounting face of circuit board P1 via solder connections and the counterpart connector 2 is mounted on the mounting face of circuit board P2 via solder connections. Next, as can be seen in FIGS. 1, 2, 3, 9, and 10, the counterpart connector 2 is positioned above the connector 1 in an orientation vertically inverted relative to the connector 1. Subsequently, the counterpart connector 2 is lowered while maintaining the same orientation, and the first signal terminal placement portion 172, second signal terminal placement portions 173, first power supply terminal placement portion 174, and second power supply terminal placement portions 177 are mated from above with the second signal terminal placement portions 73, first signal terminal placement portion 72, second power supply terminal placement portions 77, and first power supply terminal placement portion 74 of the movable housing 70 of the connector 1.

If the position of the counterpart connector 2 relative to the connector 1 is offset from the regular position toward the Y1 side in the terminal array direction (Y-axis direction) immediately prior to the start of connector mating (referred to herein as "preliminary mating"), then as the counterpart connector 2 is lowered, the preliminary guiding portion 176A of the first inner guide portion 176 of the counterpart connector 2 is brought into abutment (surface contact) with the preliminary guiding portion 79A of the second inner guide portion 79 of the connector 1, and the preliminary guiding portion 179A of the second inner guide portion 179 of the counterpart connector 2 is brought into abutment (surface contact) with the preliminary guiding portions 76A of the first inner guide portion 76 of the connector 1. Therefore, as the counterpart connector 2 is lowered, the first inner guide portion 176 and second inner guide portion 179 are guided by the preliminary guiding portions 79A, 76A toward the regular mating position, i.e., toward the Y2 side. At such time, the first signal terminal placement portion 172, second signal terminal placement portions 173, first power supply terminal placement portion 174, and second power supply terminal placement portions 177 also move toward the Y2 side.

If the position of the counterpart connector 2 relative to the connector 1 is offset from the regular position toward the Y2 side in the terminal array direction (Y-axis direction) immediately prior to the start of preliminary mating, then as the counterpart connector 2 is lowered, the preliminary guiding portion 175A of the first outer guide portion 175 of the counterpart connector 2 is brought into abutment (surface contact) with the preliminary guiding portion 78A of the second outer guide portion 78 of the connector 1, and the preliminary guiding portion 178A of the second outer guide portion 178 of the counterpart connector 2 is brought into abutment (surface contact) with the preliminary guiding portions 75A of the first outer guide portion 75 of the connector 1. Therefore, as the counterpart connector 2 is lowered, the first outer guide portion 175 and second outer guide portion 178 are guided by the preliminary guiding portions 78A, 75A toward the regular mating position, i.e., toward the Y1 side. At such time, the first signal terminal placement portion 172, second signal terminal placement portions 173, first power supply terminal placement portion 174, and second power supply terminal placement portions 177 also move toward the Y1 side.

If the position of the counterpart connector 2 relative to the connector 1 is offset from the regular position toward either side in the connector width direction (X-axis direction) immediately prior to the start of preliminary mating, then as the counterpart connector 2 is lowered, the preliminary guiding portion 175A of the first outer guide portion 175 of the counterpart connector 2 is brought into abutment (surface contact) with the preliminary guiding portion 78A of the second outer guide portion 78 of the connector 1, and the preliminary guiding portion 178A of the second outer guide portion 178 of the counterpart connector 2 is brought into abutment (surface contact) with the preliminary guiding portions 75A of the first outer guide portion 75 of the connector 1. Therefore, as the counterpart connector 2 is lowered, the first outer guide portion 175 and second outer guide portion 178 are guided by the preliminary guiding portions 78A, 75A toward the regular mating position, i.e., toward the X2 side in the event of offset toward the X1 side, and toward the X1 side in the event of offset toward the X2 side. At such time, first signal terminal placement portion 172, second signal terminal placement portions 173, first power supply terminal placement portion 174, and second power supply terminal placement portions 177 also move toward either the X2 side or the X1 side.

Mating (referred to herein as "final mating") of the first signal terminal placement portion 172, second signal terminal placement portions 173, first power supply terminal placement portion 174, and second power supply terminal placement portions 177 with the second signal terminal placement portions 73, first signal terminal placement portion 72, second power supply terminal placement portions 77, and first power supply terminal placement portion 74 of the connector 1 starts after the counterpart connector 2 has been guided by the preliminary guiding portions 75A, 76A, 78A, and 79A.

If the position of the counterpart connector 2 relative to the connector 1 is offset toward either side in the terminal array direction (X-axis direction) immediately prior to the start of final mating, then as the counterpart connector 2 is lowered, the final guiding portions 172D of the first signal terminal placement portion 172 of the counterpart connector 2 are brought into abutment (surface contact) with the final guiding portions 73D of the second signal terminal placement portions 73 of the connector 1, and the final guiding portions 173D of the second signal terminal placement portions 173 of the counterpart connector 2 are brought into abutment (surface contact) with the final guiding portions 72D of the first signal terminal placement portion 72 of the connector 1. In addition, the final guiding portions 174D of the first power supply terminal placement portion 174 of the counterpart connector 2 are brought into abutment (surface contact) with the final guiding portions 77D of the second power supply terminal placement portions 77 of the connector 1, and the final guiding portions 177D of the second power supply terminal placement portions 177 of the counterpart connector 2 are brought into abutment (surface contact) with the final guiding portions 74D of the first power supply terminal placement portion 74 of the connector 1. Therefore, as the counterpart connector 2 is lowered, the first signal terminal placement portion 172, second signal terminal placement portions 173, first power supply terminal placement portion 174, and second power supply terminal placement portions 177 are guided toward the regular mating position, i.e., toward the X2 side in the event of offset toward the X1 side, and toward the X1 side in the event of offset toward the X2 side.

If the position of the counterpart connector 2 relative to the connector 1 is offset from the regular position toward either side in the terminal array direction (Y-axis direction) while final mating is in progress, then as the counterpart connector 2 is lowered, the final guiding portion 172D of the first signal terminal placement portion 172 of the counterpart connector 2 is brought into abutment (surface contact) with the final guiding portions 71B-1 of the second intermediate aperture portion 71B of the connector 1, and the final guiding portions 173D of the second signal terminal placement portions 173 of the counterpart connector 2 are brought into abutment (surface contact) with the final guiding portions 71A-1 of the first intermediate aperture portions 71A of the connector 1. In addition, the final guiding portions 177D of the second power supply terminal placement portions 177 of the counterpart connector 2 are brought into abutment (surface contact) with the final guiding portions 71C-1 of the first end aperture portions 71C of the connector 1. Therefore, as the counterpart connector 2 is lowered, the first signal terminal placement portion 172, second signal terminal placement portions 173, and second power supply terminal placement portions 177 are guided toward the regular mating position, i.e., toward the Y2 side in the event of offset toward the Y1 side, and toward the Y1 side in the event of offset toward the Y2 side. At the same time, the first power supply terminal placement portion 174 also moves toward either the Y2 side or the Y1 side.

If the position of the counterpart connector 2 relative to the connector 1 in the process of the final mating is offset toward either side in the connector width direction (X-axis direction) while final mating is in progress, then as the counterpart connector 2 is lowered, the final guiding portion 172D of the first signal terminal placement portion 172 of the counterpart connector 2 is brought into abutment (surface contact) with the final guiding portions 71B-1 of the second intermediate aperture portion 71B of the connector 1, the final guiding portions 173D of the second signal terminal placement portions 173 of the counterpart connector 2 are brought into abutment (surface contact) with the final guiding portions 71A-1 of the first intermediate aperture portions 71A of the connector 1, and the final guiding portions 177D of the second power supply terminal placement portions 177 of the counterpart connector 2 are brought into abutment (surface contact) with the final guiding portions 71C-1 of the first end aperture portions 71C of the connector 1. Therefore, as the counterpart connector 2 is lowered, the first signal terminal placement portion 172 and second power supply terminal placement portions 177 are guided toward the regular mating position, i.e., toward the X2 side in the event of offset toward the X1 side, and toward the X1 side in the event of offset toward the X2 side. At the same time, the second signal terminal placement portions 173 and first power supply terminal placement portion 174 also move toward either the X2 side or the X1 side.

Figure 12B:
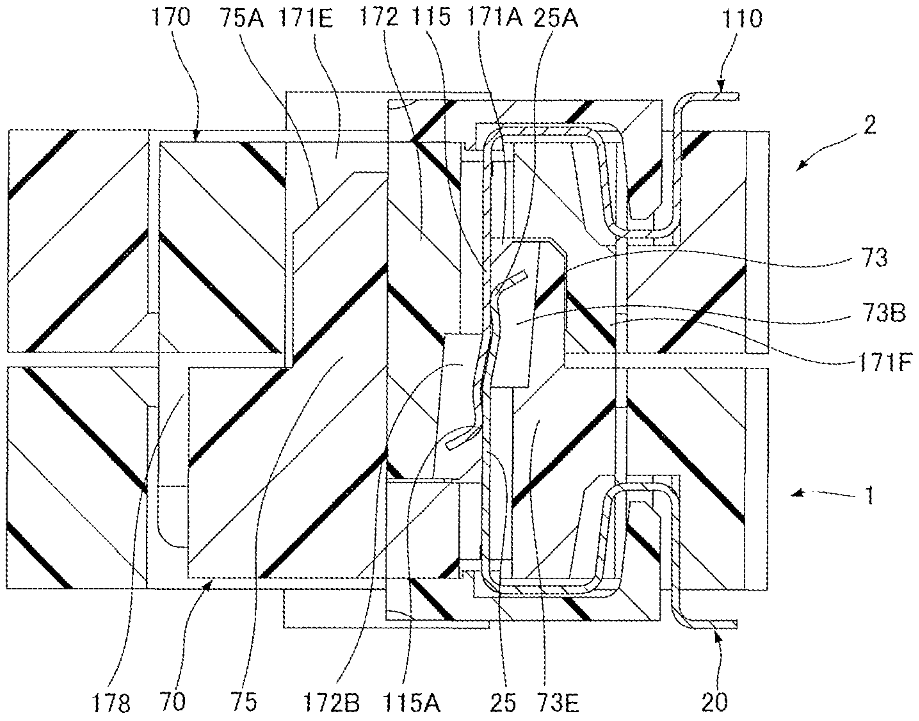

As shown in FIGS. 11(B) and 12(B), when final mating proceeds after bringing the counterpart connector 2 to the regular mating position in this manner, the first signal terminal placement portion 172 of the counterpart connector 2 enters the second intermediate aperture portion 71B from above between the two opposing wall portions 73E of the second signal terminal placement portions 73 of the connector 1. In addition, at the same time, the opposing wall portions 73E of the second signal terminal placement portions 73 of the connector 1 enter the first intermediate aperture portions 171A of the counterpart connector 2 from below. Furthermore, the first signal terminal placement portion 72 of the connector 1 enters the second intermediate aperture portion 171B from below between the opposing wall portions 173E of the second signal terminal placement portions 173 of the counterpart connector 2. In addition, at the same time, the opposing wall portions 173E of the second signal terminal placement portions 173 of the counterpart connector 2 enter the first intermediate aperture portions 71A of the connector 1 from above. As a result, the first signal terminals 10 and first signal terminals 110, as well as the second signal terminals 20 and second signal terminals 120, are placed in contact.

In addition, as shown in FIGS. 11(B) and 12(B), the first power supply terminal placement portion 174 of the counterpart connector 2 enters between the two second power supply terminal placement portions 77 of the connector 1 from above. Furthermore, at the same time, the first power supply terminal placement portion 74 of the connector 1 enters between the two second power supply terminal placement portions 177 of the counterpart connector 2 from below. As a result, the first signal terminals 30 and first signal terminals 130, as well as the second signal terminals 40 and second signal terminals 140, are placed in contact.

In addition, as shown in FIG. 11(B), the bottom portion of the first inner guide portion 176 and the bottom portion of the first outer guide portion 175 of the counterpart connector 2 enter the bottom portion of the second end aperture portion 71E of the connector 1 from above. At the same time, as shown in FIG. 11(B), the top portion of the first inner guide portion 76 and the top portion of the first outer guide portion 75 of the connector 1 enter the top portion of the second end aperture portion 171E of the connector 2 from below. Furthermore, as shown in FIG. 11(B), the bottom portion of the second outer guide portion 178 of the counterpart connector 2 enters the end receiving portion 63A of the connector 1 from above, and the bottom portion of the second inner guide portion 179 of the counterpart connector 2 enters the inner end aperture portion 71D of the connector 1 from above. At the same time, as shown in FIG. 11(B), the top portion of the second outer guide portion 78 of the connector 1 enters the end receiving portion 163A of the counterpart connector 2 from below, and the second inner guide portion 79 of the connector 1 enters the inner end aperture portion 171D of the counterpart connector 2 from below.

Assembling the connector 1 and counterpart connector 2 in this manner completes the operation of mating connection of the connectors.

In the present embodiment, in the process of performing the mating connection of the two connectors, guidance is first provided by the preliminary guiding portions 75A, 76A, 78A, and 79A, followed by guidance provided by the final guiding portions 71A-1, 71B-1, 71C-1, 72D, 73D, 74D, and 77D. Since these preliminary guiding portions are formed of larger dimensions in the direction of inclination than the final guiding portions, these preliminary guiding portions provide general guidance prior to mating the terminal placement portions 72, 73, 74, 77 and terminal placement portions 173, 172, 177, 174. Therefore, by the time that mating begins, the pairs of terminal placement portions are already brought to positions proximate to the regular mating positions.

That is to say, the pairs of terminal placement portions are brought to the regular mating positions without difficulty because by the time that guidance by the final guiding portions starts, the terminal placement portions 72, 73, 74, 77 and terminal placement portions 173, 172, 177, 174 are located in positions proximate to the regular mating positions. In this manner, in the present embodiment, when the two movable housings 70, 170 are brought into abutment with each other in the vertical direction, guidance is provided by these final guiding portions, thereby making it possible to adequately avoid damage to the terminal placement portions 72, 73, 74, 77 and terminal placement portions 173, 172, 177, 174.

In addition, despite the fact that in the present embodiment the first guide portions 75, 76 and second guide portions 78, 79, as well as the second guide portions 178, 179 and first guide portions 175, 176 of the connector 1 and counterpart connector 2, are initially brought into abutment using a relatively high mating operating force at the beginning of the mating operation, these first guide portions and second guide portions are formed of a thickness that is adequate to form the preliminary guiding portions in the terminal array direction and connector width direction, and, as a result, even when they are brought into abutment using the aforementioned mating operating force, they possess sufficient strength to counteract it and are not likely to be damaged. In addition, abutment between the first guide portions and second guide portions reduces the subsequently applied mating operating force. Therefore, even though they are brought into abutment during mating, the terminal placement portions 72, 73, 74, 77 and terminal placement portions 173, 172, 177, 174 become less likely to be damaged.

A state of contact between the second signal terminals 20 of the connector 1 and the first signal terminals 110 of the counterpart connector 2 in a state of mated connection between the two connectors is illustrated in the right half of FIG. 12(B). As shown in FIG. 12(B), the contact portion 115A of the first signal terminal 110 is placed in contact with the bottom portion of the contact arm portion 25 of the second signal terminal 20 under contact pressure, and the contact portion 25A of the second signal terminal 20 is placed in contact with the top portion of the contact arm portion 115 of the first signal terminal 110 under contact pressure. At such time, the top portion, i.e., the section corresponding to the movable-side terminal groove portion 73B, of the second signal terminals 20 of the connector 1 is subject to resilient deformation outwardly in the connector width direction, and the bottom portion, i.e., the section corresponding to the movable-side terminal groove portion 172B, of the first signal terminals 110 of the counterpart connector 2 is subject to resilient deformation outwardly in the connector width direction. Resilient deformation of the second signal terminals 20 is permitted by the movable-side terminal groove portions 73B while resilient deformation of the first signal terminals 110 is permitted by the movable-side terminal groove portions 172B.

As described above, the contact portion 115A of the first signal terminal 110 is placed in contact with the bottom portion of the contact arm portion 25 of the second signal terminal 20, i.e., with the section extending along the interior surface of the bottom portion of the opposing wall portion 73E of the movable housing 70. Although the bottom portion of this contact arm portion 25 is subject to contact pressure directed outwardly in the connector width direction from the contact portion 115A, at such time, it is externally supported in the connector width direction by the bottom portion of the opposing wall portion 73E.

In the present embodiment, the wall thickness dimensions (dimensions in the connector width direction) of the bottom portion of the opposing wall portion 73E are larger than the wall thickness dimensions of the top portion thereof. Therefore, sufficient strength to make it possible to counteract external forces applied by the contact portions 115A of the first signal terminals 110, i.e., external forces directed outwardly in the connector width direction, can be ensured in the bottom portion. As a result, restricting deformation of the opposing wall portions 73E makes it possible to prevent damage to said opposing wall portions 73E.

As described above, the top portion of the contact arm portion 25 of the second signal terminals 20 is subject to resilient deformation outwardly in the connector width direction, and this resilient deformation is permitted by the movable-side terminal groove portion 73B formed in the top portion of the opposing wall portion 73E. In the present embodiment, the wall thickness dimensions of the top portions of the opposing wall portions 73E increase as one moves downwardly within a range corresponding to the movable-side terminal groove portions 73B in the vertical direction. Adopting such a shape for the top portions of the opposing wall portions 73E allows for significant flexural deformation of the terminals within the top portions of the movable-side terminal groove portions 73B while making it possible to ensure significant strength in the sections of the opposing wall portions 73E corresponding to the bottom portion of the movable-side terminal groove portions 73B. Therefore, even if the contact arm portions 25 were to undergo excessive flexural deformation and abut the interior wall surface of the movable-side terminal groove portions 73B, sufficient strength to make it possible to counteract the external forces applied by the contact arm portions 25 can be ensured in the opposing wall portions 73E. As a result, restricting deformation of the opposing wall portions 73E makes it possible to prevent damage to said opposing wall portions 73E.

In addition, in the present embodiment, as shown in FIG. 12(B), when the connectors are matingly connected, the support wall portions 171F of the counterpart connector 2 are located outwardly of the opposing wall portions 73E of the connector 1 in the connector width direction and placed in a face-to-face relationship with the exterior lateral faces of said opposing wall portions 73E, thereby making it possible to externally support the opposing wall portions 73E in the connector width direction. Therefore, the opposing wall portions 73E are externally supported by said support wall portions 171F in the connector width direction, and the top portions of the contact arm portions 25 can counteract external forces directed outwardly in the connector width direction from the contact portions 115A with the help of the supporting force provided thereby. As a result, restricting deformation of the opposing wall portions 73E directed outwardly in the connector width direction makes it possible to prevent damage to said opposing wall portions 73E.

In addition, in the present embodiment, not only are movable-side terminal groove portions 73B shaped in this manner, but other movable-side terminal groove portions in the connector 1 and counterpart connector 2 have the same shape as said movable-side terminal groove portions 73B. Therefore, sufficient strength can be ensured in the movable housings 70, 170 at locations corresponding to those other movable-side terminal groove portions.

In addition, as shown in FIG. 12(B), when the connectors are matingly connected, the support wall portions 171F of the movable housing 170 of the counterpart connector 2 are in proximate face-to-face relationship with the exterior lateral faces of the opposing wall portions 73E of the connector 1 and can externally support said opposing wall portions 73E in the connector width direction. Therefore, even if the contact arm portions 25 were to undergo excessive flexural deformation and abut the interior wall surface of the movable-side terminal groove portions 73B, the external forces applied by the contact arm portions 25 can be counteracted with the help of the supporting force directed inwardly in the connector width direction from the support wall portions 171F. As a result, restricting deformation of the opposing wall portions 73E directed outwardly in the connector width direction makes it possible to prevent damage to said opposing wall portions 73E. Although the description herein covers effects obtained in the opposing wall portions 73E of the connector 1, similar effects are obtained in the opposing wall portions 173E of the counterpart connector 2.

Although in the present embodiment the final guiding portions are provided both in the first signal terminal placement portion and in the second signal terminal placement portion, as an alternative, the final guiding portions may be provided in either one of the first signal terminal placement portion and second signal terminal placement portion. In addition, although the final guiding portions are provided both in the first power supply terminal placement portion and in the second power supply terminal placement portions, as an alternative, the final guiding portions may be provided in either one of the first power supply terminal placement portion and second power supply terminal placement portions.

Although in the present embodiment the cover member is provided in a connector in which the direction of connection to the counterpart connect body is a direction perpendicular to the mounting face of the circuit board, connectors in which the cover member is provided are not limited thereto and, for example, may be so-called right-angle connectors in which the direction of connection to the counterpart connect body is a direction parallel to the mounting face of the circuit board.

Although in the present embodiment the cover member is attached such that the direction of attachment is an upwardly facing direction normal to the mounting face of the circuit board, the direction of attachment of the cover member is not limited thereto. For example, if the intermediate portions of the terminals are exposed when the connector is viewed from the lateral side (in a direction parallel to the mounting face of the circuit board), the cover member may be adapted to be attached to a lateral face of the connector (surface perpendicular to the mounting face of the circuit board) such that the direction of attachment is a direction parallel to the mounting face of the circuit board.

Although in the present embodiment the cover member is provided in a floating connector in which floating action of the movable housing is made possible by resilient deformation of the resilient portions of the terminals, the connector provided with the cover member does not necessarily have to be a floating connector and, for example, may be a connector in which terminals are retained within in a single non-floating housing. At such time, the cover member may be attached to the housing and may also be attached to the terminals.

Although in the present embodiment only one cover member is provided in the connector, as an alternative, there may be provided a plurality of cover members. At such time, for example, the cover member of the present embodiment may be configured to be split into a plurality of sections in the terminal array direction.

DESCRIPTION OF THE REFERENCE NUMERALS

1 Connector
2 Counterpart connector (counterpart connect body)
10 First signal terminals
11 Stationary-side retained portion
12 movable-side retained portion
13 Resilient portion
14 Connection portion
15A Contact portion
20 Second signal terminals
21 Stationary-side retained portion
22 Movable-side retained portion
23 Resilient portion
24 Connection portion
25A Contact portion
60 Stationary housing
70 Movable housing
90 Cover member
91 Main body portion
93 Upright portion
P1 Circuit board
P1B Ground layer
P1C Empty area

The invention claimed is:

1. An electrical connector for circuit boards disposed on a mounting face of a circuit board comprising:

a plurality of terminals and a housing retaining the plurality of terminals, the terminals having a connection portion provided at one end and connectable to the mounting face, a contact portion provided at an other end and capable of making contact with a counterpart connect body, and an intermediate portion coupling the connection portion and the contact portion, wherein:

there is provided a cover member made of an electrically insulating material that is attached to the housing or the terminals in a predetermined direction of attachment, the cover member has a plate-shaped main body portion whose major faces extend in a direction transverse to the direction of attachment, and the main body portion is provided at a rearward end of the electrical connector for circuit boards in the direction of attachment and, as seen in the direction of attachment, covers a range that includes, at least in part, sections of the intermediate portions of the terminals that are exposed from the housing, the housing has a stationary housing secured to the circuit board through the intermediate portion of the terminals, and a movable housing capable of relative motion with respect to the stationary housing, the terminals are provided spanning between the stationary housing and the movable housing, the intermediate portion has a stationary-side retained portion retained in the stationary housing, a movable-side retained portion retained in the movable housing, and a resilient portion located between the stationary-side retained portion and movable-side retained portion and capable of resilient deformation, and the cover member is attached to the stationary housing or to the movable housing and is not in contact with the resilient portions at least when the resilient portions are in their free state.

2. The electrical connector for circuit boards according to claim 1, wherein the terminals have a shape obtained by bending a metal strip-like piece in the direction of attachment and have U-shaped sections bent in a manner to be open toward a surface that faces the terminals at a time of attachment, and the cover member has upright portions that in the direction of attachment from the plate-shaped main body portion and are positioned in a manner to enter the U-shaped sections.

3. The electrical connector for circuit boards according to claim 2, wherein the stationary-side retained portions are provided extending in the direction of attachment as part of the U-shaped sections and are formed of a greater width than other parts coupled to the stationary-side retained portions, and the upright portions have a portion thereof positioned along coupling sections of the stationary-side retained portions and the other parts.

4. The electrical connector for circuit boards according to claim 1, wherein the cover member is attached such that the direction of attachment is an upwardly facing direction at right angles to the mounting face of the circuit board, and covers a range including, at least in part, the exposed sections of the intermediate portions from below.

5. An electrical connector with a circuit board in which the connector for circuit boards according to claim 1 is mounted on a mounting face of a circuit board, wherein:

the circuit board has a ground layer extending along the mounting face, and the ground layer has empty areas formed within ranges corresponding to the connecting portions of the terminals.

* * * * *